United States Patent

Takamori et al.

[11] Patent Number: 6,041,067
[45] Date of Patent: Mar. 21, 2000

[54] DEVICE FOR SYNCHRONIZING DATA PROCESSING

[75] Inventors: Hiroki Takamori, Osakasi; Takayuki Morisige, Ujisi, both of Japan

[73] Assignee: Matsushita Electric Industrial Co., Ltd., Japan

[21] Appl. No.: 08/943,198

[22] Filed: Oct. 3, 1997

[30] Foreign Application Priority Data

Oct. 4, 1996 [JP] Japan ..................... 8-264301

[51] Int. Cl.[7] .............................. H04J 3/06
[52] U.S. Cl. .................. 370/514; 370/516; 348/464
[58] Field of Search ......................... 370/503, 508, 370/509, 512, 516, 518, 514; 348/464, 423

[56] References Cited

U.S. PATENT DOCUMENTS

| | | | |
|---|---|---|---|
| 5,396,497 | 3/1995 | Veltman . | |
| 5,559,999 | 9/1996 | Maturi et al. | 395/550 |
| 5,621,772 | 4/1997 | Maturi et al. | 375/366 |
| 5,668,601 | 9/1997 | Okada et al. | 348/423 |
| 5,784,119 | 7/1998 | Noda et al. | 348/512 |
| 5,884,004 | 3/1999 | Sato et al. | 386/98 |

Primary Examiner—Hassan Kizou
Assistant Examiner—Ahmed Elallam
Attorney, Agent, or Firm—Parkhurst & Wendel, L.L.P.

[57] ABSTRACT

A device for synchronizing data processing, which receives input data comprising a plurality of data blocks comprising plural data sequences, and data block boundary detecting means; reference time detecting means for detecting reference time information required for updating a reference of synchronization; demultiplexing means for demultiplexing the input data; N pieces of means for detecting data processing/output time from one of the data sequences that shows a time to process and output data; and means for synchronizing data processing/output, according to the data processing/output time information detected by the N pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference, and these values in different data blocks have no interrelations, boundaries of data blocks can be detected, and synchronization can be updated for each data clock.

34 Claims, 16 Drawing Sheets

Fig.20

| SC | output data PTS | data | |
|---|---|---|---|
| | | SCR | PTS |
| 0 | | 0 | 2 |
| 1 | | 1 | 3 |
| 2 | 2 | 2 | 4 |
| ⋮ | 3 | ⋮ | ⋮ |
| | 4 | | |
| ⋮ | ⋮ | | |
| 98 | 98 | 98 | 100 |
| 99 | 99 | 99 | 101 |
| 100 | 100 | 100 | 102 |
| 101 | 101 | | |
| 102 | 102 | | |
| 0 | black screen | 0 | 2 |
| 1 | discontinuous | 1 | 3 |
| 2 | 2 | 2 | 4 |
| 3 | 3 | 3 | 5 |
| 4 | 4 | 4 | 6 |
| ⋮ | ⋮ | ⋮ | ⋮ |

Fig.21

| SC | output data PTS | data | |
|---|---|---|---|
| | | SCR | PTS |
| 0 | | 0 | 2 |
| 1 | | 1 | 3 |
| 2 | 2 | 2 | 4 |
| ⋮ | 3 | ⋮ | ⋮ |
| | 4 | | |
| ⋮ | ⋮ | | |
| 98 | 98 | 98 | 100 |
| 99 | 99 | 99 | 101 |
| 100 | 100 | 100 | 102 |
| 101 | 101 | 0 | 2 |
| 102 | 102 | 1 | 3 |
| 2 ←-- | --2-- set -- | --2 | 4 |
| 3 | 3 | 3 | 5 |
| 4 | 4 | 4 | 6 |
| ⋮ | ⋮ | ⋮ | ⋮ |

Fig.22

| SC | output data PTS | data SCR | PTS |
|---|---|---|---|
| 0 | | 0 | 2 |
| 1 | | 1 | 3 |
| 2 | 2 | 2 | 4 |
| ⋮ | 3 | ⋮ | ⋮ |
| | 4 | | |
| ⋮ | ⋮ | | |
| 98 | 98 | 98 | 100 |
| 99 | 99 | 99 | 101 |
| 100 | 100 | 100 | 102 |
| 101 | 101 | 0 | 2 |
| 102 | 102 | 1 | 3 |
| 103  stop comparison | 2  synchronization off | 2 | 4 |
| 3 ←------------- | --- 3 -------- set ------ | ----3 | 5 |
| 4 | 4 | 4 | 6 |
| ⋮ | ⋮ | ⋮ | ⋮ |

6,041,067

DEVICE FOR SYNCHRONIZING DATA PROCESSING

FIELD OF THE INVENTION

The present invention relates to a device for performing a plurality of data processing synchronously.

BACKGROUND OF THE INVENTION

Recently, in the field of information processing, 'Multimedia' has been developed rapidly, in which various kinds of media, such as video and audio media, are combined in optimum forms for various applications.

There are various types of multimedia, for example, multimedia communication, multimedia broadcasting, and multimedia packages. Typical multimedia packages are video CDs and CD-ROMs from which video and audio information can be reproduced using game machines or personal computers.

FIG. 11 is a block diagram illustrating a CD moving picture player for reproducing video CDs and CD-ROMs. With reference to FIG. 11, reference numeral 901 designates a CD drive identical to an ordinary CD drive for music CDs. An MPEG system decoder 902 decodes an input stream. An MPEG video decoder 903 decodes an output from the MPEG system decoder 902. An MPEG audio decoder 904 decodes an output from the MPEG system decoder 902. The MPEG system decoder 902, the MPEG video decoder 903, and the MPEG audio decoder 904 are integrated in an MPEG decoding LSI 900. The MPEG video decoder 903 and the MPEG audio decoder 904 use RAMs 905 and 906 for decoding, respectively. A video output processor 907 processes an output from the MPEG video decoder 903. An audio output processor 908 processes an output from the MPEG audio decoder 904. A video output terminal 909 outputs the output from the video output processor 907 to an external monitor or the like (not shown). An audio output terminal 910 outputs the output from the audio output processor 908 to an external speaker or the like (not shown).

FIG. 12 shows a physical format of a video CD, such as a video CD or a CD-ROM. In FIG. 12, reference numeral 12 denotes a spiral signal track formed on one side of a disk 10, and the signal track 12 consists of plural tracks of numbers T1~Tn (hereinafter referred to simply as tracks T1~Tn). On the tracks T1~Tn, programs of different contents are recorded.

FIG. 13 shows a format of data recorded on the tracks of the CD shown in FIG. 12. In the FIG. 13 reference numeral 11a denotes a header (HD), 11b denotes a system clock reference (SCR), 11c denotes a presentation time stamp (PTS), and 11d denotes packet data (PD) for one frame.

A description is given of the operation of the CD moving picture player. Data recorded on the disk 10 shown in FIG. 12 in the format shown in FIG. 13 is reproduced by the CD drive 901 shown in FIG. 11. The MPEG system decoder 902 divides the reproduced digital data into MPEG1 video information and MPEG1 audio information, whereby video and audio information which has been encoded according to MPEG1 encoding algorithm when recorded on the disk is decoded by MPEG1 decoding algorithm.

The MPEG video decoder 903 receives the MPEG1 video information from the MPEG system decoder 902, and decodes the information according to MPEG1 decoding algorithm to restore digital video information before encoding. The video output processor 907 receives the digital video information from the MPEG video decoder 903, converts the digital video information to analog video information, and outputs the analog video information through the video output terminal 909 to an external monitor or the like.

On the other hand, the MPEG audio decoder 904 receives the MPEG1 audio information from the MPEG system decoder 902, and decodes the information according to MPEG1 audio algorithm to restore digital audio information before encoding. The audio output processor 908 receives the digital audio information from the MPEG audio decoder 904, converts the digital audio information to analog audio information, and outputs the analog audio information through the audio output terminal 910 to an external speaker or the like.

Since the CD moving picture player uses a CD format as a recording medium of moving picture information, even when the disk is flawed or dust attaches to the CDs, reproduction is possible. Further, video images are not deteriorated over many years. Furthermore, since random access to video programs is possible, handling is facilitated, so that the user can enjoy video reproduction easily.

However, a decoder for decoding a bit stream including, in addition to video data and audio data, data that is digitally added to the video data and displayed, has not been widely used yet.

In recent years, a DVD (Digital Versatile Disk) system employing optical disk media as small as CDs and realizing high-definition and long-hour video/audio reproduction has been developed. Further, the DVD system provides new functions which have not been realized by conventional AV (Audio Visual) equipment, for example, 'Multiple Camera Angles' by which the viewer can select more than one angle for particular shorts, 'Multi-Plot Movies' by which the viewer can change the plot development according to personal taste, and 'Multilingual Dialog & Subtitles' corresponding to plural languages.

The DVD system provides a recording density seven times as high as that of a CD and compresses recorded data to 1/40 of original data by employing MPEG2 data encoding, resulting in improved image quality, increased recording hours, and multi-functions.

A DVD player is implemented by, in the CD moving picture player shown in FIG. 11, making the MPEG decoding LSI applicable to MPEG2.

Hereinafter, video data that is produced for the purpose of being displayed on a screen is called 'main-picture data', and video data that is digitally added to the main-picture data when displayed, such as sub-titles, is called 'sub-picture data'.

Further, an output time per unit output is given to each of the main-picture data, audio data, and sub-picture data, and this output time is called 'presentation time stamp (PTS)' following an expression used in "ITU-T recommendation H.222" or "ISO/IEC 13818-1".

Further, in order to know whether the time from turn-on of a decoder, such as a CD moving picture player, to start reproduction of a disk reaches the PTS or not, a clock serving as a reference is needed. This clock is implemented by a digital counter in a decoder as shown in FIG. 14. Hereinafter, this clock is called 'system clock'.

In FIG. 14, an optical pickup 13 reads information recorded on the disk. A decoder 14 converts the information read by the optical pickup 13 to digital information, and decompresses the digital information to restore the original video or audio information. A system clock 15 is contained in the decoder 14. A monitor television set 16 displays video information decoded by the decoder 14. A speaker 17 reproduces audio information decoded by the decoder 14.

A reference time for setting the system clock 15 is added to data, i.e., a bit stream to be decoded. Hereinafter, this reference time is called 'system clock reference (SCR)' following an expression used in "ITU-T recommendation H.222" or "ISO/IEC 13818-1".

According to the time counted by the system clock 15 that is set at the SCR, the decoder 14 performs data processing with reference to PTS values added to the main-picture data, the audio data, and the sub-picture data, and outputs main-picture data, audio data, and sub-picture data. A PTS shows a timing to output compressed video or audio data in one frame. When the value of the system clock 15 (hereinafter referred to as SC value) matches or exceeds the PTS values, the main-picture data, the audio data, and the sub-picture data are synchronized with each other so that data per unit output to which the PTS values are added are output.

PTS and SCR are usually added to each single bit stream having a coherent content, such as a title, with '0' as a reference. Hereinafter, such a single bit stream is called 'video object (VOB)'.

FIG. 15 shows an example of a VOB. In FIG. 15, M denotes data for displaying a menu screen shown in FIG. 16 on a monitor, and P1~P5 denote programs having different contents. Each program is composed of plural data packets and, in each packet, information of one frame is stored in a format as shown in FIG. 13.

The menu screen shown in FIG. 16 is displayed on the monitor when the VOB is reproduced. In this example, titles of reproducible programs P1~P5 are displayed on the right side of the monitor screen while numerals 1~5 corresponding to the respective programs are displayed on the left side. When the viewer presses a numerical key on a remote control transmitter having the same number as a program on the menu screen for which the viewer wants to play, the decoder 14 reproduces the title (program) of the number. When the viewer presses the numerical key at random, for example, 1→4, random reproduction of the programs, i.e., program 1→program 4, is possible.

By the way, in the main-picture data, audio data, and sub-picture data constituting the VOBs, information about which VOB the data belongs to is not added at all. When the main-picture data and the audio data are decoded by the conventional CD moving picture player, decoding is executed having no regard for relations between these data and the boundaries of the VOBs. Since decoding of the sub-picture data follows the decoding method of the main-picture data, the sub-picture data is decoded having no regard for relations with the boundaries of the VOBs.

A description is now given of drawbacks of the conventional decoder constructed as mentioned above.

When plural VOBs including main-picture data, audio data, and sub-picture data and having SCR values starting from "0" are successively decoded, since the SCR values take initial values at the heads of the respective VOBs, the SCR values are discontinuous at the boundaries of the VOBs.

However, the main-picture data must be output synchronously with the SC value, and it must be continuous at the boundaries of the VOBs. Further, the main-picture data must be successively output to the monitor without that the same image (frame) is continuously output due to an interruption in decoding.

In FIG. 17, the abscissa shows the real time, and the ordinate shows the SC value and the PTS value. In VOB 1, the system clock starts from C1 ("0" in FIG. 17) at time T0 (t=0) and gradually increases, while the PTS starts from P1 ("2" in FIG. 17) at time T1 (t=2).

In VOB 2, since the SCR value and the PTS value are given with '0' as a reference, the SCR value must be set in the system clock when image output for the VOB 1 has ended. However, since the conventional decoder decodes data with no regard for relations with the boundary of the VOBs 1 and 2, correct timing to set the SCR value in the system clock is not known in the VOB 2.

Hence, a decoder for decoding a bit stream including main-picture data, audio data, and sub-picture data is requested to know the end of data processing and output in the VOB. The reason will be described hereinafter with reference to FIGS. 19 and 20.

FIG. 19 is d flowchart for explaining the reproducing operation of the conventional CD moving picture player. FIG. 20 shows the relationships between SCR and PTS values (data) included in the VOBs 1 and 2, SC values, and output data PTS values.

First of all, as shown in FIG. 20, two kinds of data, SCR and PTS, are described in data constituting the VOBs 1 and 2. The SCR is data of 33 bits serving as a reference for count of the system clock 15 shown in FIG. 14, and the SCR has "0" as an initial value and increases by "1" for each single frame. In step S200, the CD moving picture player starts reproduction (play). In step S201, the SCR is detected. In step S202, the SCR value is set in the system clock 15, whereby the system clock 15 performs counting operation that starts from an initial value "0" and increases by "1" so that the counted value corresponds to the SCR value.

The PTS is time management information for reproduction and output, and it consists of data of 33 bits like the SCR. Considering a delay time required for data processing in the decoder, the PTS value described is by "2" larger than the SCR value in the packet of the same frame. In step S203, the SC value is compared with the PTS value. When it is detected in step S204 that the SC value is equal to or larger than the PTS value, data of the frame is output in step S205. In step S206, data of the next PTS is obtained.

Therefore, as shown in FIG. 20, the SCR and the PTS added to data to be decoded start from "0" and "2", respectively, and increase each by "1", whereby the SC value starts from "0" and increases by "1". Since the initial PTS value is "2", when the SC value becomes "2", data of a frame whose SCR value is "0", i.e., data of the first frame, is output. At this time, a frame whose SCR value is "2" is input. Thereafter, data of frames are successively output at such timing that two frames are delayed from the SCR value. The system clock 15 performs self-propelled count after setting of the initial value except when it is adjusted by the SCR value sometimes. After the SCR value reaches "100", the system clock 15 continues self-propelled count, and the SC value increases as "101", "102", whereby frames whose PTS values are "101" and "102" are successively output.

When data processing for the first VOB 1 has ended as mentioned above, the next VOB 2 is input, and the SC value is updated to "0" by the SCR value "0" of the first frame in the VOB 2. Thereafter, in the same manner as mentioned above, the SC value increases by "1" at every input of data of one frame. Since data of the first frame whose SCR value is "0" is not output until the SC value becomes "2", there is no data to be output in a period from the end of the output of data in the previous VOB 1 to the output of data in the first frame of the next VOB 2. Thereby, the screen turns black for a moment, and the image on the screen is interrupted.

Further, an image of the last frame in the VOB 1 is continuously output until an image of the first frame in the VOB 2 is output.

In order to solve the above-mentioned problem, it is necessary to detect boundaries of VOBs and to output data with such timing that the output data are not discontinuous at the detected boundaries of the VOBs.

Even though it is known that the image output for the VOB 1 is completed at time T101, there is a case where the SCR value of the VOB 2 cannot be set in the system clock at time T102. With reference to FIG. 17, it is assumed that, after the PTS value has become P2 ("2" in FIG. 17) at time T102 (t=103), the SCR value C2 ("3", and C2>P2) is set in the system clock at time T103 (t=104).

In a period from T101 to T103, i.e., at time T102, the SC value exceeds the PTS value. In a synchronous system, when the SC value is larger than the PTS value exceeding a prescribed reference value, the system tries to bring the PTS value close to the SC value by stopping output of the image being processed to advance output of the next image. Therefore, in the synchronous system, when the main-picture data is decoded without considering the relations with the boundary of the VOBs, if the same synchronization as mentioned above is performed in the period from T101 to T104, since the SC value is larger than the PTS value exceeding a prescribed reference value, a portion of image output is skipped, resulting in discontinuous image.

Therefore, a decoder for decoding a bit stream including main-picture data, audio data, and sub-picture data is required to output images continuously at the VOB boundaries, without skipping or interrupting a portion of image output or continuously outputting the same image.

Further, similar problems occur in decoding of audio data and in output of data including sub-picture data.

Therefore, the decoder for decoding a bit stream including main-picture data, audio data, and sub-picture data is required to output sounds continuously at the VOB boundaries, without skipping or interrupting a portion of sound output.

Furthermore, in the conventional decoder for decoding a bit stream including main-picture data, audio data, and sub-picture data, when the SC value is discontinuous, the following problem occurs.

FIG. 18 is an output timing chart of sub-picture data intermittently superposed on main-picture data, such as captions, when the system clock 15 takes discontinuous values.

In this case, the main-picture data must be output synchronously with the SC value, and it must be continuous at the boundaries of the VOBs. Further, the main-picture data must be output to the monitor successively without that the same image is continuously output due to an interruption in decoding. Contrary to this, the sub-picture data must be output to the monitor intermittently and synchronously with the SC value. In FIG. 18, the abscissa shows the real time. The SC value starts from C1 ("0" in FIG. 18) at time T0 (t=0), and becomes C2 ("2" in FIG. 18) at time T102 (t=103) for setting the SCR value of the VOB 2.

The PTS values of the sub-picture data are discontinuous because the sub-picture data are intermittently output to the monitor as follows: sub-picture data 1 in a period from T11 to T12, sub-picture data 2 in a period from T13 to T14, and sub-picture data 3 in a period from T15 to T16. Accordingly, when the sub-picture data are decoded without considering relations between the data and the boundaries of the VOBs, the following problem occurs. Assuming that the PTS of the sub-picture data 3 is obtained after image output of the sub-picture data 2 has ended and the obtained PTS is compared with the SC value, since the SC value exceeds the PTS value, image output of the sub-picture data 3 is started. That is, the sub-picture data to be output in the VOB 2 is unfavorably output in the VOB 1.

The reason why the data of the VOB 2 exists in the decoder at the image output time for the VOB 1 is because a data storage means like DRAM is contained in or connected to the decoder.

Consequently, the decoder for decoding a bit stream including main-picture data, audio data, and sub-picture data is requested to perform image output of data included in each VOB, correctly, within the output time for the VOB.

SUMMARY OF THE INVENTION

It is an object of the present invention to provide a device for synchronizing data processing, that can correctly detect boundaries of plural data sequences, each sequence comprising a series of data blocks having a coherent content, and that can process and output data included in the data sequences successively, in the temporal order, without skipping or delaying the processing.

It is another object of the present invention to provide a device for synchronizing data processing, that can correctly detect boundaries of plural data sequences, each sequence comprising a series of data blocks having a coherent content, and that can process and output data included in the data sequences, in correct timing, in units of data to which processing/output timings are added.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a device for synchronizing data processing, which receives N (N=integer, 1≦N) pieces of data sequences, each sequence comprising plural data blocks, and the device comprises N pieces of data processing/output means, each processing data included in one of the input data sequences and outputting the processed data, according to synchronous information; and means for synchronizing data processing/output, which updates a reference of synchronization, according to data block boundary designating information that shows boundaries of the data blocks constituting the N pieces of data sequences, and outputs the synchronous information to the N pieces of data processing/output means, according to data processing/output timing information that shows data processing/output timings of the N pieces of data sequences, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, it is possible to update the reference of synchronization for each data block, at every boundary of data blocks.

According to a second aspect of the present invention, there is provided a device for synchronizing data processing, which receives input data comprising a plurality of data blocks, each block comprising plural data sequences, and the device comprises data block boundary detecting means for detecting boundaries of the data blocks in the input data, and outputting data block boundary designating information showing the boundaries of the data blocks; reference time detecting means for detecting, from the input data, reference time information required for updating a reference of synchronization; demultiplexing means for demultiplexing the input data into N (N=integer, 1≦N) pieces of data sequences; N pieces of data processing/output means, each means processing data included in one of the input data sequences and outputting the processed data, according to synchronous information; N pieces of means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N pieces of data processing/output means, according to the data processing/output time information detected by the N pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, boundaries of data blocks can be detected, whereby the reference of synchronization can be updated for each data block.

According to a third aspect of the present invention, there is provided a device for synchronizing data processing, which receives input data comprising a plurality of data blocks, each block comprising plural data sequences, and this device comprises reference time detecting means for detecting, from the input data, reference time information required for updating a reference of synchronization; detecting a boundary of data blocks in the input data by comparing the detected reference time information with reference time information which has previously been detected, and outputting data block boundary designating information; demultiplexing means for demultiplexing the input data into N (N=integer, N≦1) pieces of data sequences; N pieces of data processing/output means, each means processing data included in one of the input data sequences and outputting the processed data, according to synchronous information; N pieces of means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N pieces of data processing/output means, according to the data processing/output time information detected by the N pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, boundaries of data blocks can be detected using the reference time information included in the input data, whereby the reference of synchronization can be updated for each data block.

According to a fourth aspect of the present invention, there is provided a device for synchronizing data processing, which receives input data comprising a plurality of data blocks, each block comprising plural data sequences, and the device comprises reference time detecting means for detecting, from the input data, reference time information required for updating a reference of synchronization; demultiplexing means for demultiplexing the input data into N (N=integer, 1≦N) pieces of data sequences; N pieces or data processing/output means, each processing data included in one of the input data sequences and outputting the processed data, according to synchronous information; M (M=integer, 1≦M≦N) pieces of means for comparing data processing/output time, each means detecting, from one of the data sequences, data processing/output time information that shows a time to process and output data included in the data sequence, detecting a boundary of data blocks in the input data by comparing the detected data processing/output time information with data processing/output time information which has previously been detected, and outputting data block boundary designating information; (N−M) pieces of means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N pieces of data processing/output means, according to the data processing/output time information detected by the M pieces of means for comparing data processing/output time and by the (N−M) pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, boundaries of data blocks can be detected using the data processing/output time information which is obtained continuously, whereby the reference of synchronization can be updated for each data block.

According to a fifth aspect of the present invention, there is provided a device for synchronizing data processing, which receives input data comprising a plurality of data blocks, each block comprising plural data sequences, and the device comprises data inserting means for, according to data block boundary designating information that shows boundaries of data blocks in the input data, inserting data showing the data block boundaries into the input data; reference time detecting means for detecting, from the input data, reference time information required for updating a reference of synchronization; demultiplexing means for demultiplexing the input data into N (N=integer, 1≦N) pieces of data sequences and the inserted data; M (M=integer, 1≦M≦N) pieces of data analysis means for analyzing the inserted data to detect the boundaries of data blocks in the input data, and outputting the data block boundary designating information; N pieces of data processing/output means, each processing data included in one of the input data sequences and outputting the processed data, according to synchronous information; N pieces of means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N pieces of data processing/output means, according to the data processing/output time information detected by the N pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, boundaries of data blocks can be detected using the data block boundary designating information which is previously included in the input data, whereby the reference of synchronization can be updated for each data block.

According to a sixth aspect of the present invention, there is provided a device for synchronizing data processing, which receives input data comprising a plurality of data blocks, each block comprising plural data sequences, and the device comprises reference time detecting means for detecting, from the input data, reference time information required for updating a reference of synchronization; demultiplexing means for demultiplexing the input data into N (N=integer, $1 \leq N$) pieces of data sequences; M (M=integer, $1 \leq M \leq N$) pieces of data storage means, each storing one of the N pieces of data sequences, recognizing a boundary of data blocks according to data block boundary transmitting information showing positions of boundaries of data blocks in the stored data sequence, and outputting data block boundary designating information when output of data up to the recognized data block boundary has completed; N pieces of data processing/output means, each processing data included in one of the input data sequences and outputting the processed data, according to synchronous information; N pieces of means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N pieces of data processing/output means, according to the data processing/output time information detected by the N pieces of means for detecting data processing/output time, so that the N pieces of data processing/output means are synchronized with each other and process and output the data in the respective data sequences in correct timings along the temporal order. Therefore, when a reference time value and a data processing/output time value are assigned for each data block with a prescribed value as a reference and these values in different data blocks have no interrelations, boundaries of data blocks can be detected, whereby the reference of synchronization can be updated, block by block, for data which is input intermittently.

According to a seventh aspect of the present invention, there is provided a device for synchronizing data processing, which receives an input data sequence and decodes the data sequence in the order designated by a host device, the input data sequence comprising plural sequences of data blocks and having data processing/output timing information that is given so that its value continuously increases while a data block is being processed and returns to an initial value when proceeding to the next data block. This device comprises reference time setting means for setting reference time information, which is synchronized with the data processing/output timing information and varies from the data processing/output timing information by a prescribed value, in a reference clock to provide a reference time; data processing/output means for outputting decoded data when a difference between the data processing/output timing information and the reference time information becomes a prescribed value; and data block boundary detecting means for detecting a boundary of data blocks by that the data processing/output timing information returns to the initial value when the data processing changes to the next data block in the input data sequence. In this device, after the data block boundary detecting means detects that the data processing changes to the next data block in the input data sequence, the value of the reference time is continuously increased for a prescribed period of time and then the reference time information is set in the reference clock by the reference time setting means, whereby continuity of output data at the boundary of the data blocks is secured. Therefore, when a reference time value and a data processing/output time value are assigned for each data block with a prescribed value as a reference and these values in different data blocks have no interrelations, boundaries of data blocks can be detected on the basis of a piece of timing information included in the input data, whereby the reference of synchronization can be updated for each data block.

According to an eighth aspect of the present invention, there is provided a device for synchronizing data processing, which receives an input data sequence and decodes the data sequence in the order designated by a host device, the input data sequence comprising plural sequences of data blocks and having reference time information that is given so that its value increases continuously while a data block is being processed and returns to an initial value when proceeding to the next data block, and data processing/output timing information that is given so that its value increases while a data block is being processed and returns to an initial value when proceeding to the next data block. This device comprises reference time setting means for setting the reference time information in a reference clock to provide a reference time; data processing/output means for outputting decoded data when a difference between the data processing/output timing information and the reference time becomes a prescribed value; and data block boundary detecting means for detecting a boundary of data blocks by that the reference time information returns to the initial value when the data processing changes to the next data block in the input data sequence. In this device, after the data block boundary detecting means detects that the data processing changes to the next data block in the input data sequence, the value of the reference time is continuously increased for a prescribed period of time and then the reference time information is set in the reference clock by the reference time setting means, whereby continuity of output data at the boundary of the data blocks is secured. Therefore, when a reference time value and a data processing/output time value are assigned for each data block with a prescribed value as a reference and these values in different data blocks have no interrelations, boundaries of data blocks can be detected on the basis of two

BRIEF DESCRIPTION OF THE DRAWINGS

FIG. 20 is a diagram illustrating a table showing the relationships between SCR and PTS values, SC value, and output data PTS value, according to the prior art.

FIGS. 21 and 22 are diagrams illustrating tables each showing the relationships between SCR and PTS values, SC value, and output data PTS value, according to the first embodiment of the invention.

DETAILED DESCRIPTION OF THE PREFERRED EMBODIMENTS

Embodiment 1

A device for synchronizing data processing according to a first embodiment of the invention receives a plurality of data sequences, each sequence comprising plural data blocks having a coherent content, and processes and outputs these data sequences synchronously with each other, without interruptions.

Before describing the device in detail, the synchronization principle according to the present invention will be explained. To facilitate the explanation, it is assumed that the input data is a bit stream comprising main-picture data, audio data, and sub-picture data, and each data block is called a VOB.

Figure 3:
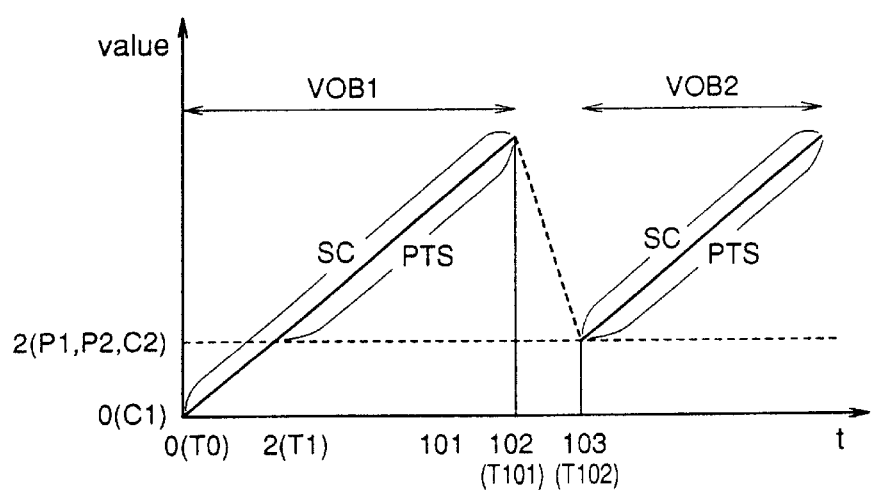
FIG. 3 is a diagram showing output timing of ideal system clock value for displaying main-picture data without interruption.

FIG. 3 is a time chart showing SCR values and PTS values for solving the problems of the conventional device. FIG. 21 shows a table for explaining timing control performed to VOBs by a decoder such as a DVD player, according to the time chart of FIG. 3.

As shown in FIG. 21, the SCR and PTS values added to data to be decoded start from "0" and "2", respectively, and increase each by "1", whereby the SC value starts from "0" and increases by "1". Since the initial PTS value is "2", when the SC value becomes "2", data of a frame whose SCR value is "0", i.e., data of the first frame, is output. At this time, a frame whose SCR value is "2" is input. Thereafter, data of subsequent frames are successively output at such timing that two frames are delayed from the SCR value. The system clock 15 performs self-propelled count after setting of the initial value except when it is sometimes adjusted by the SCR value. After the SCR value reaches "100", the system clock 15 continues self-propelled count, and the SC value increases as "101", "102". While the SC value increases, first and second frames in the VOB 2 respectively having SCR and PTS values of "0", "2", and "1", "3" have already been input. A frame in the VOB 2 whose PTS value is "2", which frame has already been input when a frame in the VOB 1 whose PTS value is "101" is output, is output in a timing next to output of the final frame in the VOB 1, i.e., a frame whose PTS value is "102", thereby avoiding unnatural reproduction in which data to be output is interrupted at the boundary between the VOBs 1 and 2 and the screen turns black for a moment.

However, since a delay exists in the decoder, as shown in FIG. 22, the SCR value "2" cannot be set in the system clock 15 when reproduction of the VOB 1 has ended, so that the system clock 15 remains in its self-propelled state. Therefore, in this timing, comparison between the SC value and the PTS value is stopped to cancel synchronization, and the frame in the VOB 2 whose PTS value is "2", which has already been input when the VOB 1 is being output, is output. In the next timing, the SC value is set to "3" according to the SCR value "3". Thereby, data are output continuously without being affected by a delay in the decoder, avoiding the above-mentioned unnatural reproduction.

In the first embodiment of the invention, boundaries of VOBs are detected on the basis of the above-mentioned principle, and plural data sequences are synchronized with each other.

Figure 5:
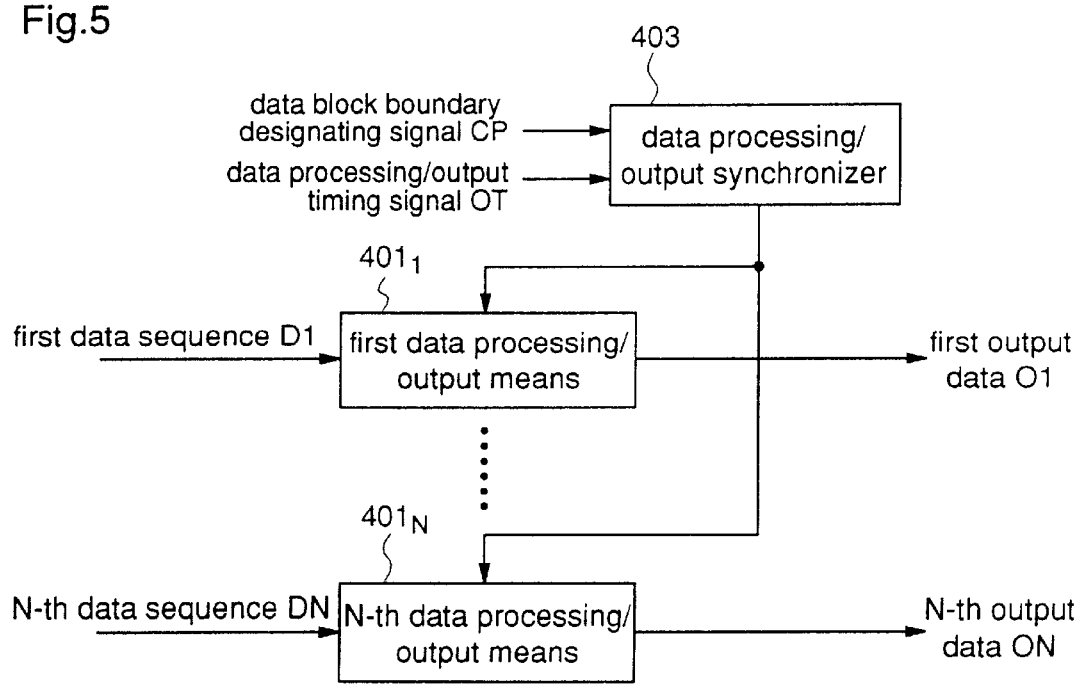
FIG. 5 is a block diagram illustrating a device for synchronizing data processing according to a first embodiment of the invention.

FIG. 5 is a block diagram illustrating a main part of a device for synchronizing data processing according to the first embodiment of the invention.

In FIG. 5, $D_1 \sim D_N$ are first to N-th data sequences input to the device, and each data sequence comprises a series of plural data blocks having a coherent content. One of these data sequences is a series of plural titles of a piece (kind) of data corresponding to any of video data, audio data, and caption data constituting a movie, or video data, audio data, and words data constituting a 'karaoke ' song, or video data, audio data, and information data constituting a game and etc. In this first embodiment, a block of data having a title is called a data block. Each data sequence corresponds to any of a video data sequence, an audio data sequence, a caption (sub-picture) data sequence, and the like.

In FIG. 5, a first data processing/output means $401_1$ processes data included in the first data sequence $D_1$ and outputs first output data $O_1$, according to a synchronous signal output from a data processing/output synchronizer 403 described later. For example, this means $401_1$ decodes main-picture data in digital data sequences obtained from a DVD disk.

This device has N pieces of data processing/output means having the same structures as the first means $401_1$, and reference numeral $401_N$ designates an N-th data processing/output means. Second to N-th data processing/output means decode data in the digital data sequences obtained from the DVD disk, other than the main-picture data, such as audio data and caption data.

Figure 14:
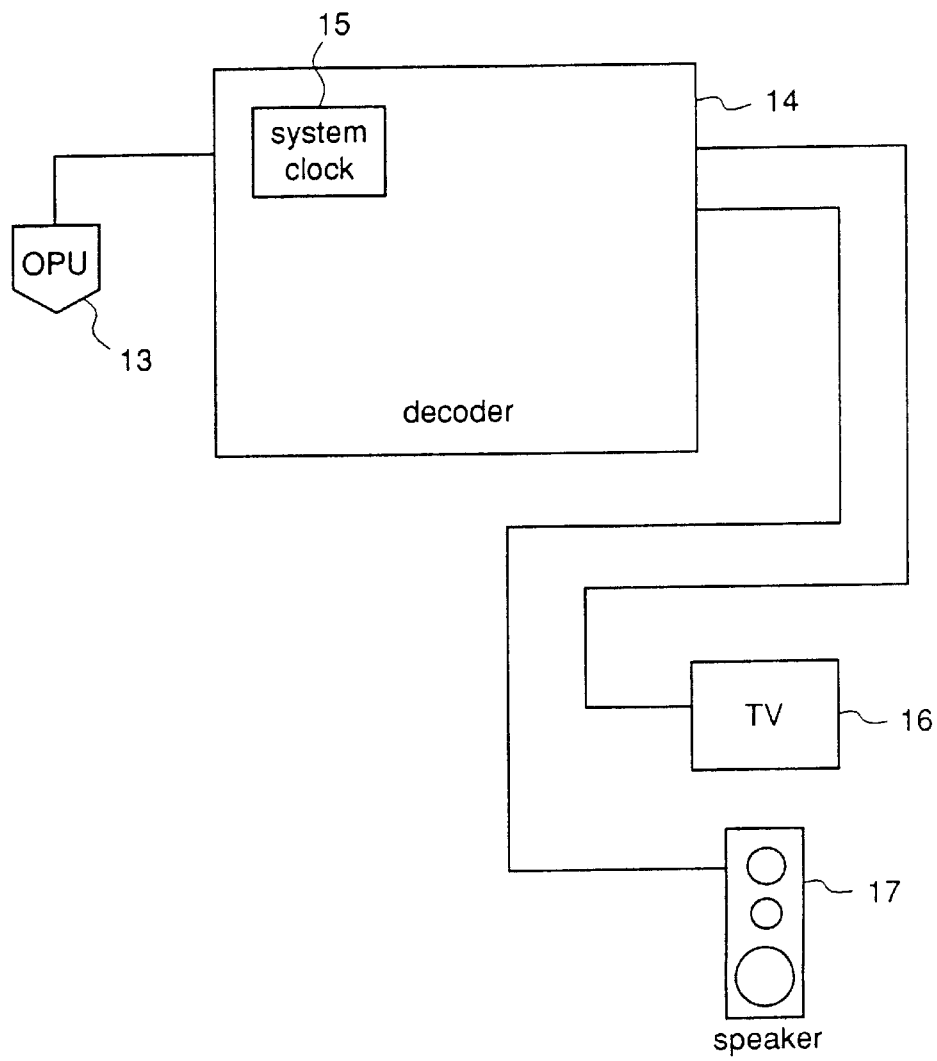
FIG. 14 is a block diagram illustrating a moving picture reproduction system including the CD moving picture player shown in FIG. 11.
Figure 15:
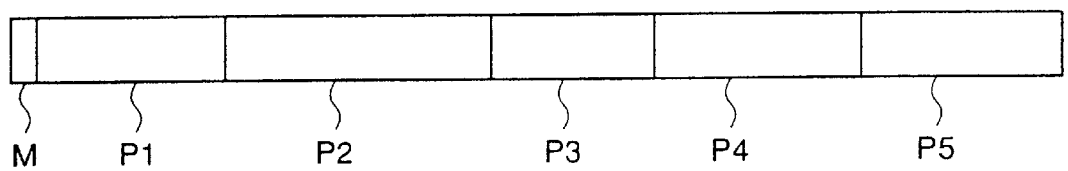
FIG. 15 is a diagram showing a structure of moving picture programs recorded on an optical disk such as a CD.
Figure 16:
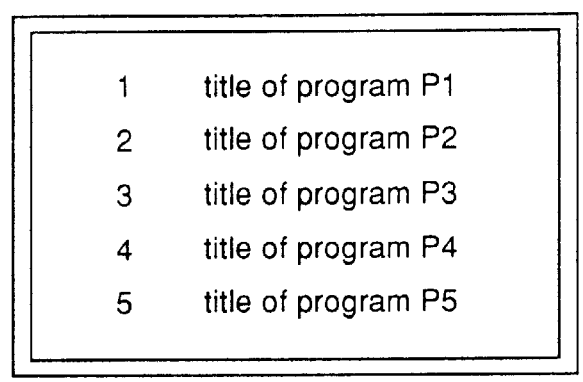
FIG. 16 is a diagram showing a menu screen for program selection.
Figure 17:
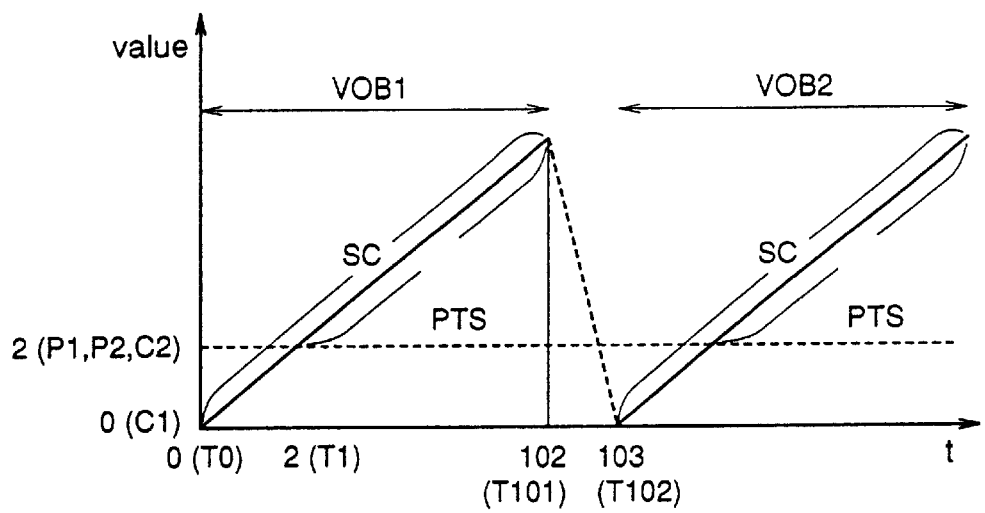
FIG 17 is a diagram showing output timing of actual system clock values for displaying main-picture data according to the prior art.

The data processing/output synchronizer 403 (hereinafter referred to simply as synchronizer) contains a system clock 15 shown in FIG. 14. This synchronizer 403 updates a reference of synchronization according to a data block boundary designating signal CP that designates boundaries of data blocks constituting the data sequences input to the first to N-th data processing/output means $401_1$ to $401_N$, so that these data processing/output means are synchronized with each other, and process and output the respective data sequences in their original timings, along the temporal order, without skipping or delaying the processing. Further, the synchronizer 403 outputs a synchronous signal in response to a data processing/output timing signal OT that provides a data processing/output timing for each data sequence, so that the first to N-th data processing/output means $401_1$ to $401_N$ process and output the data in correct timings.

A description is given of the operation.

The N pieces of input data $D_1$ to $D_N$ are input, in VOB units, to the first to N-th data processing/output means $401_1$ to $401_N$, respectively. In the first data processing/output means $401_1$, the main-picture data is decoded by the MPEG2 decoding algorithm and then output. In the second to N-th data processing/output means $401_N$, audio data, sub-picture data, and the like are decoded by MPEG2 decoding algorithm and then output.

The main-picture data will be described in detail using FIG. 3. The main-picture data is processed and output synchronously with the SC value, and it is continuous at the boundary of the VOBs. Further, since the data processing is not interrupted, the main-picture data is continuously output to the monitor without that an image just before interruption is continuously output to the monitor.

Each data sequence comprises plural VOBs. In each VOB, a data processing/output time (hereinafter referred to as a PTS) is added to a unit subjected to data processing and output, such as a frame. In addition, reference time information for updating a reference of synchronization (hereinafter referred to as an SCR) is added, too. Since, the SCR and the PTS are assigned to each VOB with "0" as a reference, these values in different VOBs have no interrelations. So, different VOBs may have the same PTS. Therefore, the SCR value must be set in the system clock simultaneously with end of image output for the VOB 1.

If data is processed and output without considering the relations with the boundary of the VOBs, a correct timing for setting the SCR value of the VOB 2 in the system clock cannot be known.

In this first embodiment of the invention, however, since the data block boundary designating signal CP is input at time T101 (t=102), the synchronizer 403 can set the SCR value C2 ("2" in this case) in the system clock at time T102 (t=103).

Accordingly, although the SCR and the PTS are assigned to each VOB with "0" as a reference and those values in different VOBs have no interrelations at all, since the boundaries of the VOBs are detected, it is possible to update a reference of synchronization for each VOB, whereby the respective data processing/output means can be synchronized with each other.

Figure 4:
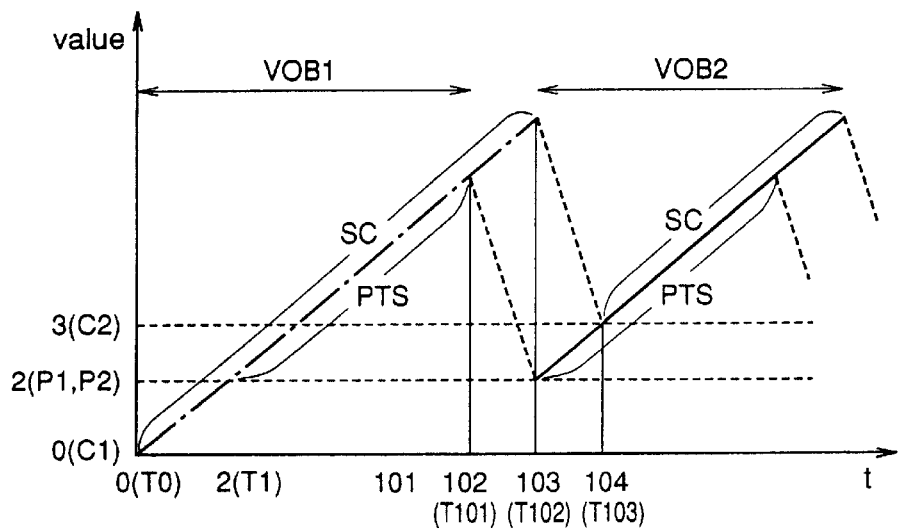
FIG. 4 is a diagram showing output timing of actual system clock value for displaying main-picture data without interruption.

Even though it is known that the image output for the VOB 1 is completed at time T102 (t=103), there is a case where the SCR value of the VOB 2 cannot be set in the system clock at time T102 (t=103). Hereinafter, this case will be described in detail. With reference to FIG. 4, it is assumed that, after the PTS value has become P2 ("2" in FIG. 4) at time T102 (t=103), the SCR value C2 ("3" in FIG. 4) is set in the system clock at time T103 (t=104).

In a period from T101 (t=102) to T103 (t=104), the SC value exceeds the PTS value. In a synchronous system, when the SC value is larger than the PTS value exceeding a prescribed reference value, the system tries to bring the PTS value close to the SC value by stopping output of the image being processed to advance output of the next image. Therefore, in the synchronous system, when the main-picture data is decoded without considering the relations with the boundary of the VOBs, if the same synchronization as mentioned above is performed in the period from T101 (t=102) to T103 (t=104), since the SC value is larger than the PTS value exceeding a prescribed reference value, a portion of image output is skipped, resulting in discontinuous images.

In this first embodiment, however, since the synchronizer 403 can detect the end of image output for the VOB 1 from the data block boundary designating signal CP, it is possible to instruct the first data processing/output means $401_1$ to cancel synchronization with the system clock. However, since the main-picture data is continuously output to the monitor, the processing/output time does not vary significantly from the real time, so that the operation of the device is not adversely affected.

Synchronization with the system clock is resumed after all the data processing/output means $401_1$ to $401_N$ process and output the last data in the VOB 1 and the first data processing/output time information of the VOB 2 is input to all the data processing/output means $401_1$ to $401_N$ by the data processing/output timing signal OT.

Accordingly, when data having continuous PTS values is processed and output while synchronizing data sequences, since the VOB boundaries are detected, continuous data processing and output are realized in the temporal order without skipping or delaying the processing. Therefore, the main image, the sub image, and the sound are output synchronously with each other with no time lag between the data sequences, thereby avoiding momentary disappearance of image on the screen at the boundaries of the data sequences.

Next, a description is given of a case where PTS values exist intermittently.

Figure 18:
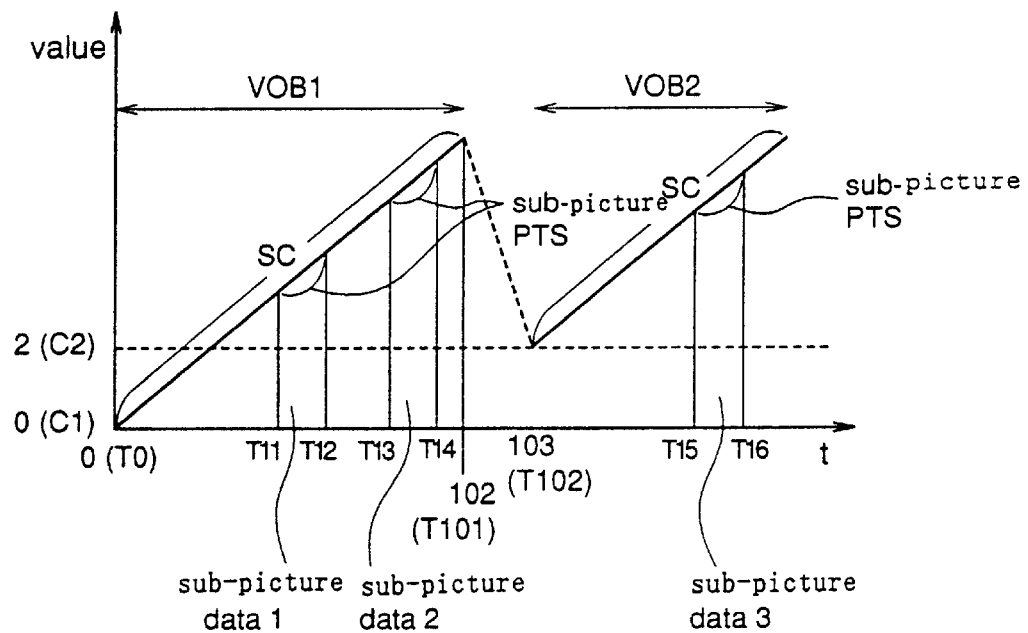
FIG. 18 is a diagram showing output timing of actual system clock values for displaying sub-picture data without interruptions.
Figure 19:
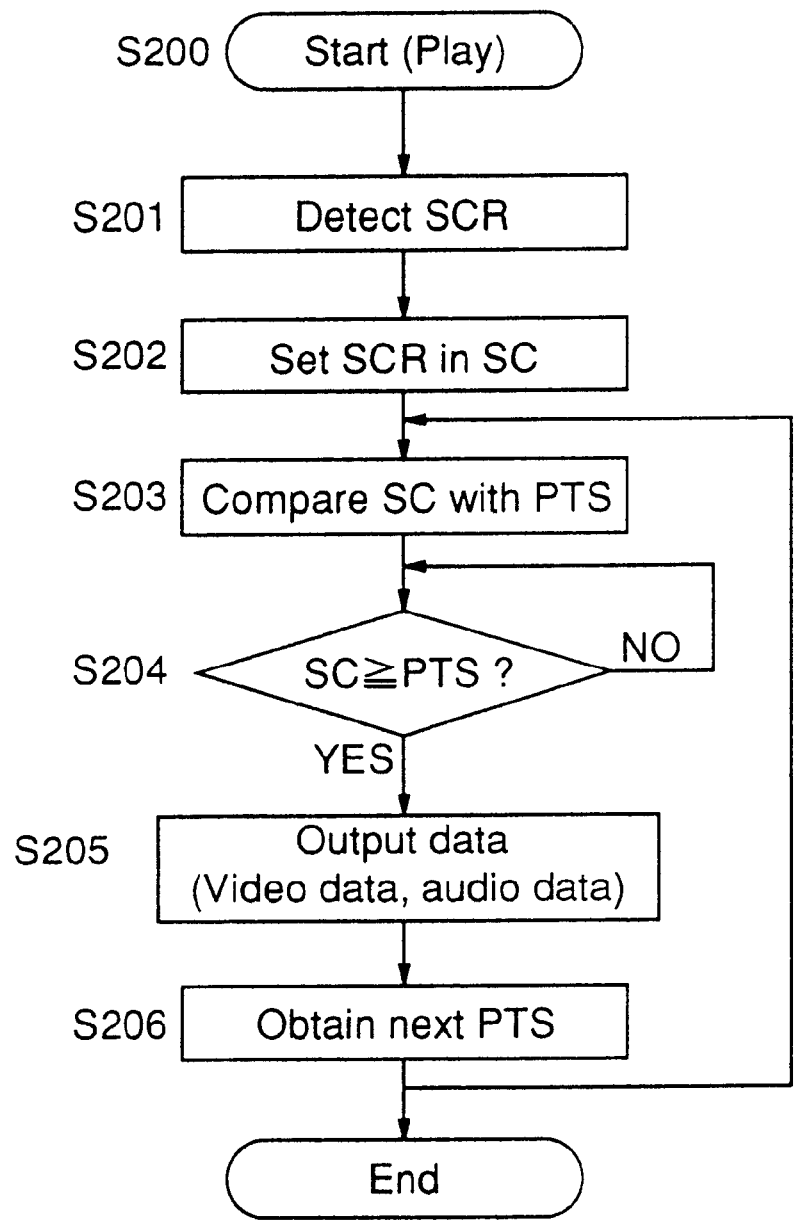
FIG. 19 is a flowchart for explaining the operation of a device for synchronizing data processing according to the prior art.

It is assumed that the N-th data processing/output means $401_N$ processes and outputs sub-picture data, and FIG. 18 is used for the description. The sub-picture data is output to the monitor intermittently and synchronously with the SC value.

Since the sub-picture data is output intermittently, no PTS exists in a period of time when no data is output, so that the values of the sub-picture PTS exist intermittently. Therefore, when the sub-picture data is processed and output with no regard for relations with the boundary of the VOBs, if the PTS value of the sub-picture data 3 is obtained and compared with the SC value after image output of the sub-picture data 2 has ended, since the SC value exceeds the PTS value, image output of the sub-picture data 3 is started. That is, the sub-picture data corresponding to the VOB 2 is unfavorably output during a period for the VOB 1.

In this first embodiment of the invention, however, since the end of image output for the VOB 1 is known from the data block boundary designating signal CP, it is possible to instruct the N-th data processing/output means $401_N$ to stop the data processing and output. The data processing and output are resumed after setting of the SCR value C2 in the system clock.

Accordingly, when data having intermittent PTS values is processed and output while synchronizing data sequences, to detect the VOB boundaries enables data processing and output in correct timings, for each data block to which the PTS is added, according to the PTS.

As described above, according to the first embodiment of the invention, there is provided a device for synchronizing data processing, which receives N pieces of data sequences, each sequence comprising plural data blocks. The device comprises first to N-th data processing/output means, each processing data included in one of the input data sequences and outputting the processed data. Further, the device comprises a data processing/output synchronizing moans for updating a reference of synchronization, according to a data block boundary designating signal that designates boundaries of the data blocks constituting the N pieces of data sequences, so that these first to N-th data processing/output means are synchronized with each other between the data sequences and process and output the N pieces of data sequences in the temporal order without skipping or delaying processing. Further, the data processing/output synchronizing means outputs a synchronous signal to the N pieces of data processing/output means, according to a data processing/output timing signal that shows data processing/output timings of the N pieces of data sequences, so that the N pieces of data processing/output means process and output data in correct timings. Therefore, when a reference time value and a data processing/output time value are given for each data block with a prescribed value as a reference and these values in different data blocks have no interrelations, since boundaries of the data blocks in each data sequence can be detected by the signal designating the boundaries of the data blocks, the reference of synchronization can be updated at this timing for each data block. Further, when data having continuous data processing/output time values is processed and output while synchronizing data sequences, to detect the data block boundaries enables continuous data processing and output, in the temporal order, without skipping or delaying processing. Furthermore, when data having intermittent data processing/output time values is processed and output while synchronizing data sequences, to detect the data block boundaries enables data processing and output in correct timings, for each data block to which the data processing/output time is added, according to the data processing/output time Data input to the device for synchronizing data processing according to this first embodiment is not restricted to a bit stream including main-picture data, audio data, and sub-picture data. Any data may be input as long as synchronous data processing (output) is desired.

Further, a method of synchronizing the respective data processing/output means $401_1$ to $401_N$ between the respective data sequences is not restricted to the method according to the first embodiment.

Embodiment 2

A device for synchronizing data processing according to a second embodiment of the invention receives serial data in which plural sequences of data, each having a coherent content, are multiplexed, and processes and outputs these data synchronously with each other without interruptions.

Figure 1:
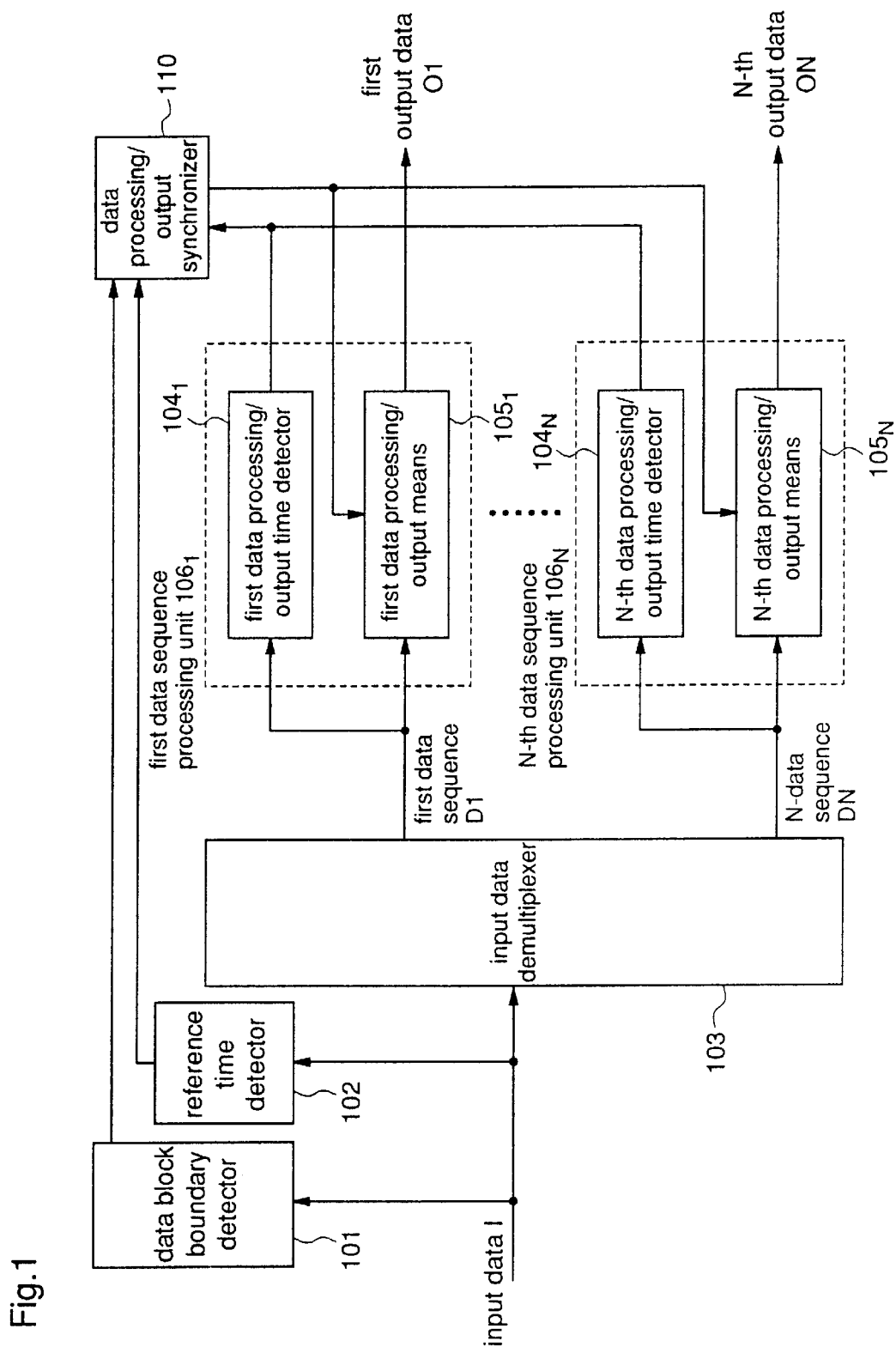
FIG. 1 is a block diagram illustrating a device for synchronizing data processing according to a second embodiment of the invention.

FIG. 1 is a block diagram illustrating a device for synchronizing data processing according to the second embodiment of the invention.

In FIG. 1, I is input data to the device, and this is serial data in which plural data corresponding to the first data sequence $D_1$ to the N-th data sequence $D_N$ according to the first embodiment are multiplexed. To the input data I, reference time information (hereinafter referred to as SCR information) and processing/output time information (hereinafter referred to as PTS information) are added in units subjected to data processing and output. The respective data sequences $D_1$ to $D_N$ constituting the input data I have been multiplexed so that these data sequences $D_1$ to $D_N$ are input to data processing/output means $105_1$ to $105_N$, respectively, and processed and output in the respective processing/output timings. These data are in units of data blocks (titles), and data of different data blocks are not mixed.

A data block boundary detector 101 detects boundaries of data blocks in the input data I. A reference time detector 102 detects, from the input data I, the SCR information to be set in a system clock that is included in a data processing/output synchronizer 110 (hereinafter referred to simply as synchronizer) in a device having this data processing synchronization device, such as a DVD player. An input data demultiplexer 103 demultiplexes the input data I in which plural data sequences are multiplexed, to individual data sequences, generating first to N-th data sequences $D_1$ to $D_N$.

A first data processing/output time detector $104_1$ detects and separates the PTS information from the first data sequence $D_1$. A first data processing/output means $105_1$ processes data included in the first data sequence $D_1$ and outputs first output data $O_1$, according to a synchronous signal output from the synchronizer 110. The first data processing/output time detector $104_1$ and the first data processing/output means $105_1$ constitute a first data sequence processing unit $106_1$. The device includes N pieces of data sequence processing units having the same structures as the first data sequence processing unit $106_1$. An N-th data sequence processing unit $106_N$ comprises an N-th data processing/output time detector $104_N$ and an N-th data processing/output means $105_N$.

The synchronizer 110 sets the SCR information detected by the reference time detector 102 in the system clock according to a data block boundary designating signal output from the data block boundary detector 101, so that the first to N-th data processing/output means $105_1$ to $105_N$ are synchronized with each other, and process and output the respective data sequences in their original timings, along the temporal order, without skipping or delaying the processing. Further, the synchronizer 110 outputs a synchronous signal according to the PTS information detected by the first to N-th data processing/output time detectors $104_1$ to $104_N$, so that the first to N-th data processing/output means $105_1$ to $105_N$ can process and output the data in correct timings.

Figure 6:
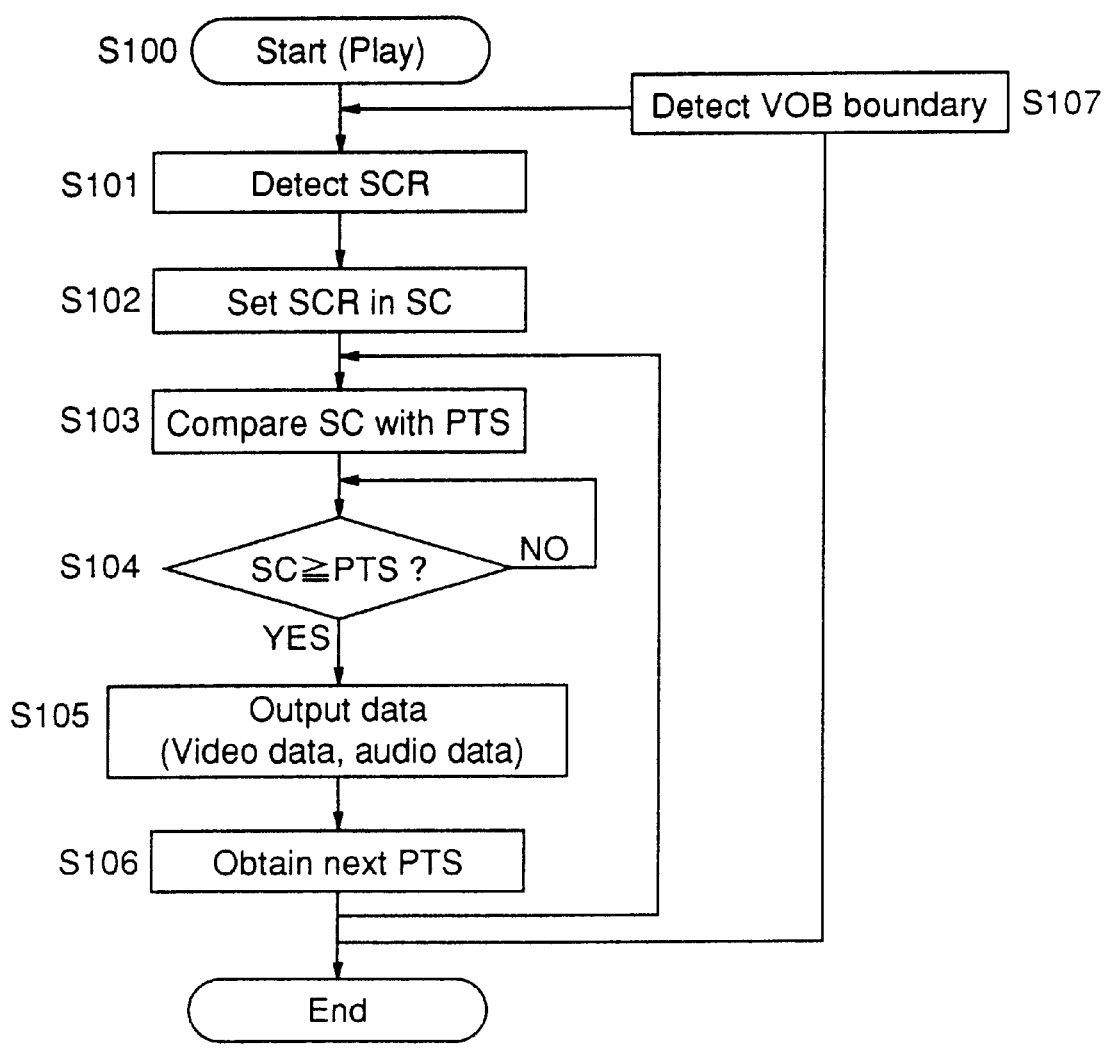
FIG. 6 is a flowchart for explaining the operation of the device according to the first embodiment.

A description is now given of the operation of the second embodiment of the invention using a flowchart of FIG. 6.

Figure 2:
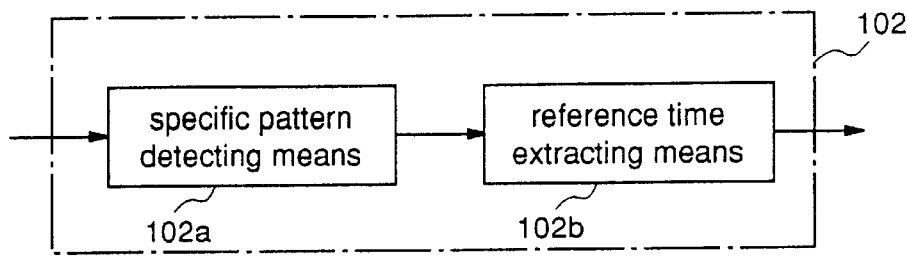
FIGS. 2(a) and 2(b) are block diagrams illustrating a reference time detector and a data processing/output time detector included in the device according to the second embodiment of the invention.
Figure 2:
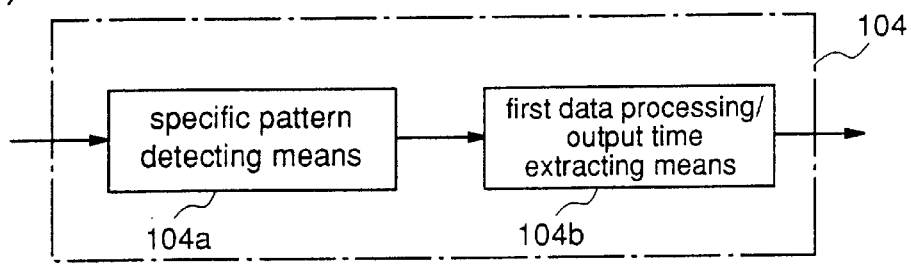

When a decoder, such as a CD moving picture player or a DVD player, is started (step S100), since data are input to the decoder in VOB units, the data block (VOB) boundary detector 101 detects a boundary of adjacent VOBs by that the SCR value is smaller than the previously detected one, and outputs a data block boundary designating signal to the synchronizer 110. In the reference time detector 102, as shown in FIG. 2(a), a specific pattern detecting means 102a detects a specific bit pattern being a header of the SCR information from the input data I, whereby a reference time extracting means 102b is driven. The reference time extracting means 102b detects the SCR information (step S101) and outputs the SCR information to the system clock in the synchronizer 110 to set the SCR information in the system clock (step S102).

The input data I is demultiplexed into individual data sequences, i.e., N pieces of data sequences $D_1$ to $D_N$. These N pieces of data sequences $D_1$ to $D_N$ are input to the data sequence processing units $106_1$ to $106_N$, respectively.

Each data sequence comprises plural VOBs, and a PTS is added to each unit subjected to data processing and output, such as a frame, in each VOB. This PTS information is detected by the data processing/output time detectors $104_1$ to $104_N$. To be specific, as shown in FIG. 2(b), a specific pattern detecting means 104a detects a specific pattern serving as a header of the PTS information, and the PTS information following the header is detected by a first data processing/output time extracting means 104b. Assuming that the first data sequence processing unit $106_1$ processes and outputs the main-picture data, the SC value of the system clock in the synchronizer 110 is compared with the PTS detected by the data processing/output time detector $104_1$ (step S103). When the SC value is equal to or larger than the PTS value (step S104), the first data processing/output means $105_1$ processes and outputs data of the frame (step S105). Further, the data processing/output time detector $104_1$ detects the next PTS (step S106) and continues comparison between the SC value and the PTS value (step S103).

As described above, the main-picture data is processed synchronously with the SC value and continuously output to the monitor. Since the data processing is continuous, the main-picture data is continuously output to the monitor.

However, since SCR and PTS are assigned to each VOB with "0" as a reference, these values in different VOBs have no interrelations. So, different VOBs may have the same PTS when the time elapsed from the head of a VOB is equal to that of another VOB. Therefore, boundaries of the VOBs is detected (step S107), and the SCR value of the VOB 2 is set in the system clock simultaneously with end of image output for the VOB 1 step S102).

If data is processed and output with no regard for relations between the data and the boundary of the VOBs 1 and 2, a correct timing for setting the SCR value of the VOB 2 in the system clock cannot be known. In this second embodiment, however, since the data block boundary designating signal is output from the data block boundary detecting means 101 at time T101 (t=102) as shown in FIG. 3, the synchronizer 110 can set the SCR value C2 ("2" in this case) in the system clock.

Accordingly, although the SCR and the PTS are assigned to each VOB with "0" as a reference and these values in different VOBs have no interrelations at all, since the boundaries of the VOBs are detected, it is possible to update a reference of synchronization for each VOB.

Even though it is found that the image output for the VOB 1 is completed at time T101 (t=102), there is a case where the SCR value of the VOB 2 cannot be set in the system clock at time T102 (t=103). Here, with reference to FIG. 4, it is assumed that, after the PTS value has become P2 ("2" in FIG. 4) at time T102 (t=103), the SCR value C2 ("3" in FIG. 4) is set in the system clock at time T103 (t=104).

In a period from T101 (t=102) to T103 (t=104), the SC value exceeds the PTS value. So, when the main-picture data is processed and output with no regard for the boundary of the VOBs, a portion of image output is skipped due to synchronization.

In this second embodiment, however, since the synchronizer 110 can detect the end of image output for the VOB 1 from the data block boundary designating signal, it is possible to instruct the first data processing/output means $105_1$ to cancel the synchronization with the system clock. However, since the main-picture data is continuously output to the monitor, the processing/output time does not vary significantly from the real time, so that the operation of the device is not adversely affected.

Synchronization is resumed after the final data processing and output in the VOB 1 are completed in all the data processing/output means $105_1$ to $105_N$ and the first data processing and output time information in the VOB 2 is detected in all the data processing/output time detectors $104_1$ to $104_N$.

As described above, when data having continuous PTS values are processed and output while synchronizing the data sequences, since the VOB boundaries are detected, continuous data processing and output are realized in the temporal order, without skipping or delaying the processing.

Next, a description is given of a case where PTS values exist intermittently.

It is assumed that the N-th data processing unit $106_N$ processes and outputs sub-picture data. The sub-picture data is output to the monitor intermittently and synchronously with the SC value.

Since the sub-picture data is output intermittently, sub-picture PTS values exist intermittently, so that the values are discontinuous. Therefore, when the sub-picture data is processed and output without considering relations with the boundary of the VOBs, if the PTS of the sub-picture data 3 is obtained and compared with the SC value after image output of the sub-picture data 2 has completed, since the SC value exceeds the PTS value, image output of the sub-picture data 3 is started. That is, the sub-picture data of the VOB 2 is unfavorably output during a period for the VOB 1.

In this second embodiment of the invention, however, since the synchronizer 110 can know the end of image output for the VOB 1 from the data block boundary designating signal, it is possible to instruct the N-th data processing/output means $105_N$ to stop data processing and output. The data processing and output are resumed after setting of the SCR value C2 in the system clock.

Accordingly, when data having intermittent PTS values is processed and output while synchronizing the data sequences, to detect the VOB boundaries enables data processing and output in correct timings, for each data block to which the PTS is added, according to the PTS.

As described above, according to the second embodiment of the invention, a device for synchronizing data processing comprises a data block boundary detecting means for detecting boundaries of data blocks in input data and outputting a data block boundary designating signal; a reference time detecting means for detecting, from the input data, reference time information required for updating a reference of synchronization; a demultiplexing means for demultiplexing the input data into N pieces of data sequences; N pieces of data processing/output means, each means processing data included in one of the data sequences and outputting the processed data, according to synchronous information; N pieces of data processing/output time detecting means, each means detecting, from one of the data sequences, data processing/output time information that shows a time to process and output data included in the data sequence; and a data processing/output synchronizing means for updating a reference of synchronization using the detected reference time information according to the data block boundary designating signal, so that the N pieces of data processing/output means are synchronized between the N pieces of data sequences and process and output the N pieces of data sequences in the temporal order without skipping or delaying processing, and for outputting the synchronous information to the N pieces of data processing/output means, according to the data processing/output time information detected by the N pieces of data processing/output time detecting medals, so that the N pieces of data processing/output means process and output data in correct timings. Therefore, when a reference time value and a data processing/output time value are given for each data block with a prescribed value as a reference and these values in different data blocks have no interrelations, since boundaries of the data blocks can be detected by the data block boundary detecting means, the reference of synchronization can be updated at this timing for each data block. Further, when data having continuous data processing/output time values is processed and output while synchronizing data sequences, to detect the data block boundaries enables continuous data processing and output, in the temporal order, without skipping or delaying processing. Furthermore, when data having intermittent data processing/output time values is processed and output while synchronizing data sequences, to detect the data block boundaries enables data processing and output in correct timings, for each data block to which the data processing/output time is added, according to the data processing/output time.

Data input to the device for synchronizing data processing according to this second embodiment is not restricted to a bit stream including main-picture data, audio data, and sub-picture data. Any data may be input as long as synchronous data processing (output) is desired.

Further, positions (connections) of the data block boundary detector 101 and the reference time detector 102 are not restricted to those shown in FIG. 1. Any of the first to N-th data sequences output from the input data demultiplexer 103 may be input to these detectors.

Furthermore, if the data processing/output time information (PTS information) of any of the data sequences is not intermittent information but changes continuously, the data processing/output time information may be used in place of the reference time information (SCR information). In this case, the reference time detector 102 can be dispensed with.

Embodiment 3

A device for synchronizing data processing according to a third embodiment of the invention receives serial data in which plural sequences of data, each having a coherent content, are multiplexed, and processes and outputs these data synchronously with each other without interruptions, while detecting boundaries of the data sequences using a reference time.

Figure 7:
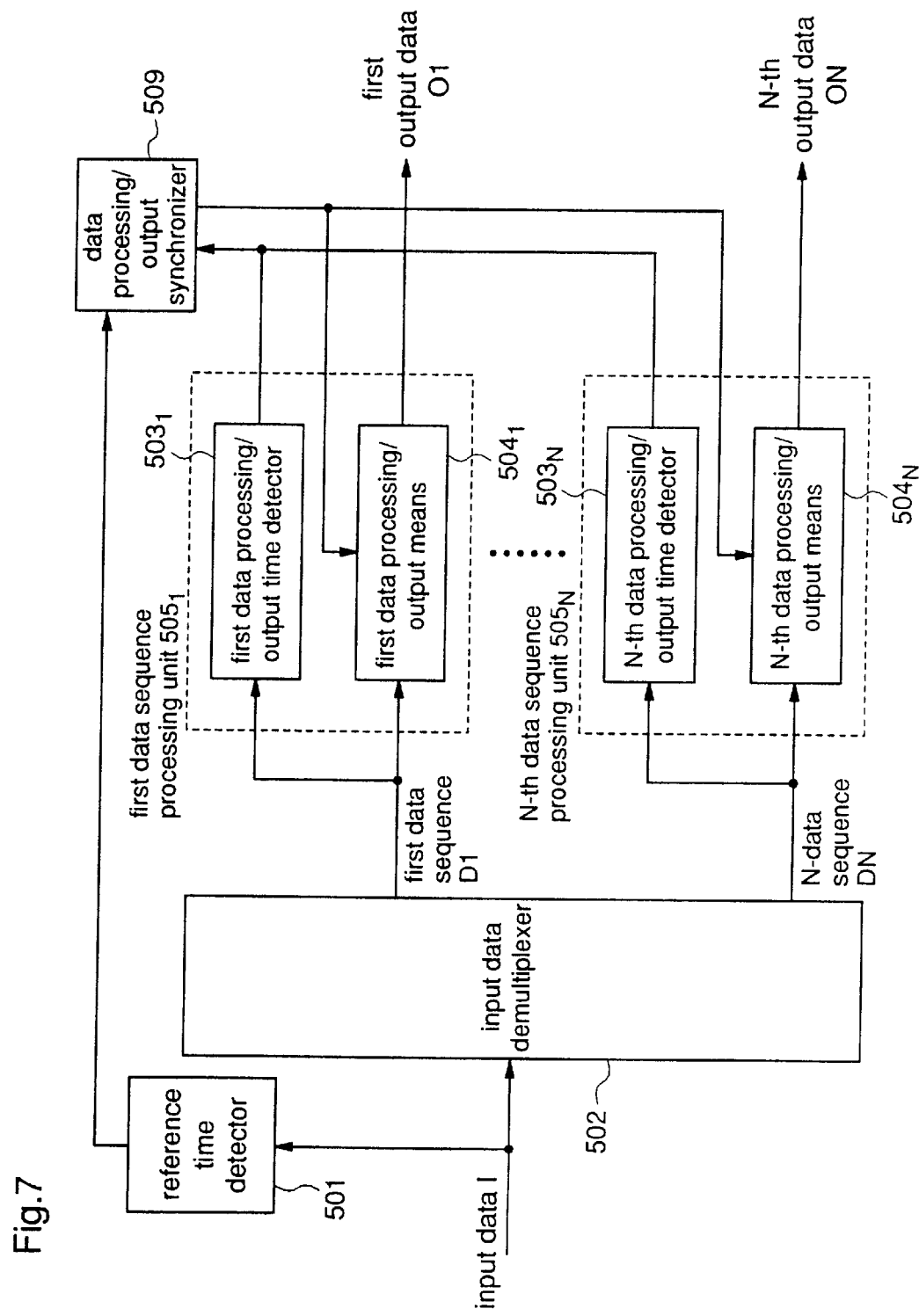
FIG. 7 is a block diagram illustrating a device for synchronizing data processing according to a third embodiment of the invention.

FIG. 7 is a block diagram illustrating a device for synchronizing data processing according to the third embodiment of the invention.

In FIG. 7, input data I is identical to that described for the second embodiment of the invention.

A reference time detector 501 detects reference time information (SCR information) to be set in a system clock, from the input data I. This reference time detector 501 is different from the reference time detector 101 according to the second embodiment in that it can detects a boundary of data blocks by comparing an SCR value detected this time with an SCR value detected previously and deciding that the present value is smaller than the previous value. An input data demultiplexer 502 demultiplexes the input data I to individual data sequences, generating first to N-th data sequences $D_1$ to $D_N$.

A first data processing/output time detector $503_1$ detects data processing/output time information (PTS information) from the first data sequence $D_1$. A first data processing/output means $504_1$ processes data included in the first data sequence $D_1$ and outputs first output data $O_1$, according to a synchronous signal output from a data processing/output synchronizer 509 described later. The first data processing/output time detector $503_1$ and the first data processing/output means $504_1$ constitute a first data sequence processing unit $505_1$. The device includes N pieces of data sequence processing units having the same structures as the first data sequence processing unit $505_1$. An N-th data sequence processing unit $505_N$ comprises an N-th data processing/output time detector $503_N$ and an N-th data processing/output means $504_N$.

The synchronizer 509 sets the SCR information detected by the reference time detector 501 in the system clock according to a data block boundary designating signal output from the reference time detector 501, so that the first to N-th data processing/output means $504_1$ to $504_N$ are synchronized with each other, and process and output the respective data sequences in the temporal order, without skipping or delaying the processing. Further, the synchronizer 403 outputs a synchronous signal according to the PTS information detected by the first to N-th data sequence processing/output time detectors $503_1$ to $503_N$, so that the first to N-th data processing/output means $504_1$ to $504_N$ can process and output the data in correct timings.

A description is now given of the operation of the third embodiment of the invention.

The reference time detector 501 detects the SCR information from the input data I and outputs the SCR information to the synchronizer 509. Further, the reference time detector 501 stores the SCR information and compares it with SCR information which has been previously detected and stored. Since the SCR information is assigned to each data block with a specific value such as "0" as a reference, it continuously increases at a constant rate in the data block, i.e., it never decreases in the middle of the data block. Therefore, if the SCR value detected this time is smaller than the SCR value previously detected, these SCR values are included in different data blocks. In this way, the reference time detector 501 detects a boundary of adjacent data blocks by detecting that the present SCR value is smaller than the previous SCR value, and outputs a data block boundary designating signal to the synchronizer 509.

The other constituents are identical to those already mentioned for the second embodiment and, therefore, do not require repeated description. The input data I is demultiplexed by the demultiplexer 502 into N pieces of data sequences $D_1$ to $D_N$.

Each data sequence comprises plural VOBs, and a PTS is added to each unit subjected to data processing and output, such as a frame, in each VOB. The PTS is detected by the data processing/output time detectors $503_1$ to $507_N$. Since the SCR and the PTS are assigned to each VOB with "0" as a reference, these values in different VOBs have no interrelations. So, different VOBs may have the same PTS when the time elapsed from the head of a VOB is equal to that of another VOB.

Therefore, although the SCR value must be set in the system clock simultaneously with the end of image output for the VOB 1, since the data block boundary designating signal is output from the reference time detector 501, the synchronizer 509 can set the SCR value in the system clock.

Accordingly, although the SCR and the PTS are assigned to each VOB with "0" as a reference and these values in different VOBs have no interrelations, since the boundaries of these VOBs are detected, it is possible to update a reference of synchronization for each VOB.

Even though it is known that the image output for the VOB 1 is completed, there is a case where the SCR value of the VOB 2 cannot be set in the system clock.

In this third embodiment, however, since the synchronizer 509 can detect the end of image output for the VOB 1 from the data block boundary designating signal, it is possible to instruct the first data processing/output means 504, to cancel the synchronization with the system clock.

Accordingly, when data having continuous PTS values is processed and output while synchronizing the data sequences, since the VOB boundaries are detected, continuous data processing and output are realized in the temporal order without skipping or delaying the processing.

Further, even when the PTS values exist intermittently, since the synchronizer 509 can know the end of image output for the VOB 1 from the data block boundary designating signal, it is possible to instruct the N-th data processing/output means $504_N$ to stop the data processing and output. The data processing and output are resumed after setting of the SCR value in the system clock.

Accordingly, when data having intermittent PTS values is processed and output while synchronizing the data sequences, to detect the VOB boundaries enables data processing and output in correct timings, for each data block to which the PTS is added, according to the PTS.

As described above, according to the third embodiment of the invention, a device for synchronizing data processing comprises a reference time detecting means for detecting, from input data, reference time information required for updating a reference of synchronization, detecting a boundary of data blocks in the input data by comparing the detected reference time information with reference time information which has previously been detected, and outputting a data block boundary designating signal; a demultiplexing means for demultiplexing the input data into N pieces of data sequences; N pieces of data processing/output means, each means processing data included in one of the input data sequences and outputting the processed data, according to synchronous information; N pieces of data processing/output time detecting means, each means detecting, from one of the data sequences, data processing/output time information that shows a time to process and output data included in the data sequence; and a data processing/output synchronizing means for updating a reference of synchronization using the detected reference time information according to the data block boundary designating signal, so that the N pieces of data processing/output means are synchronized between the N pieces of data sequences and process and output the N pieces of data sequences in the temporal order without skipping or delaying processing, and for outputting the synchronous information to the N pieces of data processing/output means, according to the data processing/output time information detected by the N pieces of data processing/output time detecting means, so that the N pieces of data processing/output means process and output data in correct timings. Therefore, when a reference time value and a data processing/output time value are given for each data block with a prescribed value as a reference and these values in different data blocks have no interrelations, since boundaries of the data blocks can be detected by comparing the reference time values, the reference of synchronization can be updated at this timing for each data block. Further, when data having continuous data processing/output time values is processed and output while synchronizing data sequences, to detect the data block boundaries enables continuous data processing and output, in the temporal order, without skipping or delaying processing. Furthermore, when data having intermittent data processing/output time values is processed and output while synchronizing data sequences, to detect the data block boundaries enables data processing and output in correct timings, for each data block to which the data processing/output time is added, according to the data processing/output time. Furthermore, boundaries of data blocks are detected from plural pieces of data blocks which are multiplexed and input to the device. Referring to the boundaries, SCR information extracted from the multiplexed data is set in the system clock, the multiplexed data is demultiplexed into plural pieces of data, and these data are processed and output synchronously with each other, whereby the reference of synchronization can be updated for each data block.

Data input to the device for synchronizing data processing according to this third embodiment is not restricted to a bit stream including main-picture data, audio data, and sub-picture data. Any data may be input as long as synchronous data processing (output) is desired.

Further, the position (connection) of the reference time detector 501 is not restricted to that shown in FIG. 7. Any of the first to N-th data sequences output from the input data demultiplexer 502 may be input to the detector 501.

Furthermore, if the data processing/output time information (PTS information) of any of the data sequences is not intermittent information but changes continuously, this data processing/output time information can be used in place of the reference time information (SCR information). In this case, it is not necessary for the reference time detector 501 to have a function of detecting data block boundaries.

Embodiment 4

A device for synchronizing data processing according to a fourth embodiment of the invention receives serial data in which plural sequences of data, are multiplexed, and processes and outputs these data synchronously with each other without interruptions while detecting boundaries of the data sequences using data processing/output time information.

Figure 8:
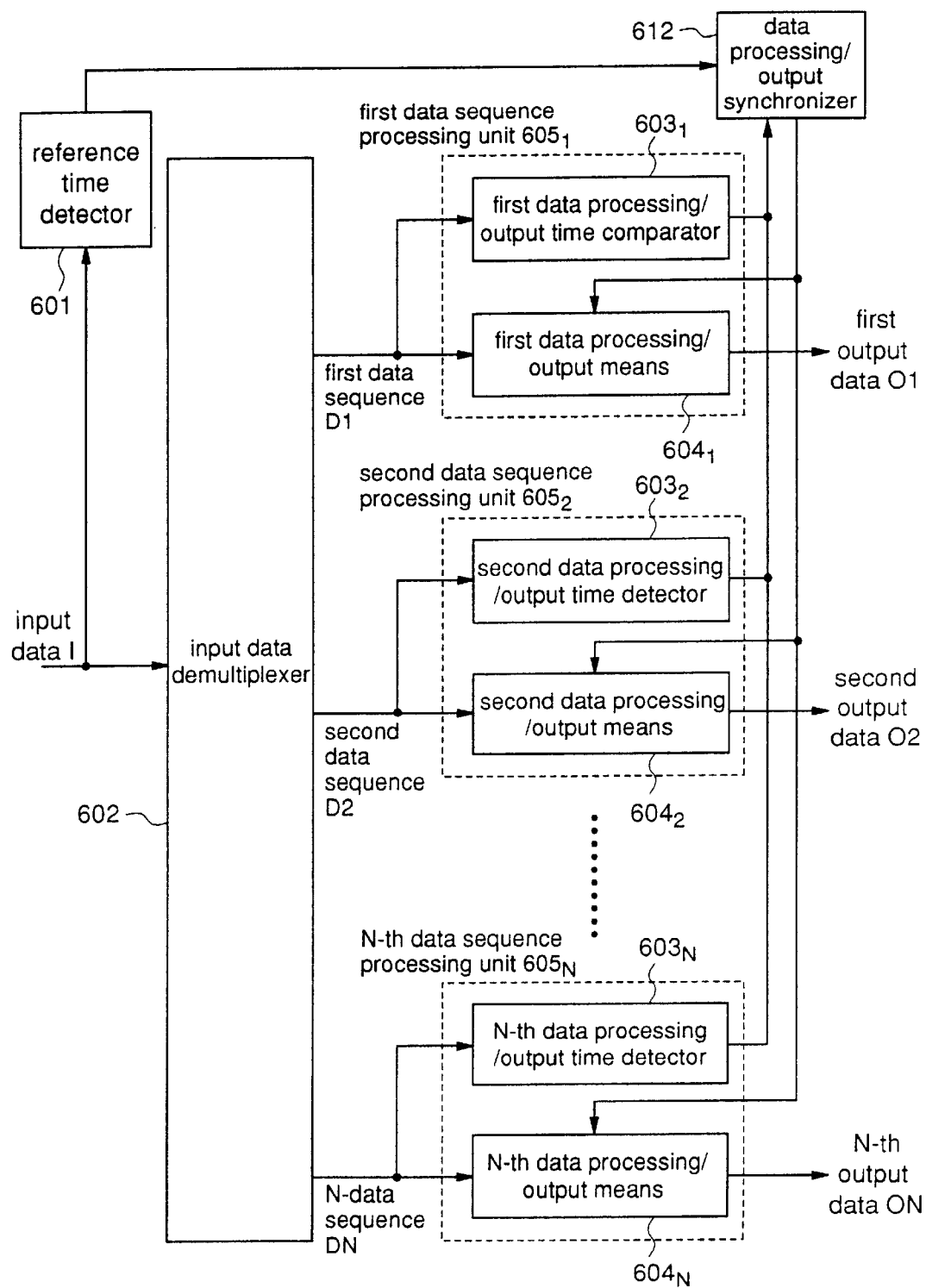
FIG. 8 is a block diagram illustrating a device for synchronizing data processing according to a fourth embodiment of the invention.

FIG. 8 is a block diagram illustrating a device for synchronizing data processing according to the fourth embodiment of the invention.

In FIG. 8, input data I is identical to that described for the second embodiment of the invention. However, at least one of the N pieces of data sequences $D_1$ to $D_N$ must have data processing/output time information that is unintermittent, i.e., continuous, and changes continuously, like main-picture data. In this fourth embodiment, the first data sequence $D_1$ has such unintermittent data processing/output time information.

A reference time detector 601 detects SCR information (reference time information) to be set in a system clock, from the input data I. An input data demultiplexer 602 demultiplexes the input data I to individual data sequences, generating first to N-th data sequences $D_1$ to $D_N$.

A first data processing/output time comparator $603_1$ detects PTS information (data processing/output time information) from the first data sequence $D_1$, compares the detected PTS value with a PTS value detected previously, and detects a boundary of data blocks when the present PTS value is smaller than the previous PTS value. A first data processing/output means $604_1$ processes data included in the first data sequence $D_1$ and outputs first output data $O_1$, according to a synchronous signal output from a data processing/output synchronizer 612. The first data processing/output time comparator $603_1$ and the first data processing/output means $604_1$ constitute a first data sequence processing unit $605_1$. Data sequences input to the data sequence processing units other than the first data sequence processing unit $605_1$ may have intermittent PTS information. A second data processing/output time detector $603_2$ detects PTS information from the second data sequence $D_2$. A second data processing/output means $604_2$ processes data included in the second data sequence $D_2$ and outputs second output data $O_2$, according to a synchronous signal output from the synchronizer 612. The second data processing/output time detector $603_2$ and the second data processing/output means $604_2$ constitute a second data sequence processing unit $605_2$. The device includes (N−1) pieces of data sequence processing units having the same structures as the second data sequence processing unit $605_2$. An N-th data sequence processing unit $605_N$ comprises an N-th data processing/output time detector $603_N$ and an N-th data processing/output means $604_N$.

The synchronizer 612 sets the SCR information detected by the reference time detector 601 in the system clock according to a data block boundary designating signal output from the first data processing/output time comparator $603_1$, so that the first to N-th data processing/output means $604_1$ to $604_N$ are synchronized with each other and process and output the respective data sequences in the temporal order, without skipping or delaying the processing. Further, the synchronizer 612 outputs a synchronous signal according to the PTS information detected by the first data sequence processing/output time comparator $603_1$ and the second to N-th data sequence processing/output time detectors $603_2$ to $603_N$, so that the first to N-th data processing/output means $604_1$ to $604_N$ process and output the data in correct timings.

A description is now given of the operation of the fourth embodiment of the invention.

The reference time detector 601 detects SCR information from the input data I and outputs the SCR information to the synchronizer 612. The first data processing/output comparator $603_1$ detects PTS information from the first data sequence $D_1$ which is input unintermittently, and outputs the PTS information to the synchronizer 612. Further, the first data processing/output time comparator $603_1$ stores the detected PTS information and compares it with PTS information which has previously been detected and stored. Since the PTS information is assigned to each data block with a specific value such as "0" as a reference, it increases continuously at a constant rate in the data block, i.e., it never decrease in the middle of the data block. Therefore, if the PTS value detected this time (present PTS value) is smaller than the PTS value previously detected (previous SCR value), these PTS values are included in different data blocks. In this way, the first data processing/output time comparator $603_1$ detects a boundary between adjacent data blocks by detecting that the present SCR value is smaller than the previous SCR value, and outputs a data block boundary designating signal to the synchronizer 612.

The other constituents are identical to those already mentioned for the second embodiment and, therefore, do not require repeated description. The input data I is demultiplexed by the demultiplexer 602 into N pieces of data sequences $D_1$ to $D_N$.

These data sequences $D_1$ to $D_N$ are input to the data sequence processing units $605_1$ to $605_N$.

Each data sequence comprises plural VOBs, and a PTS is added to a unit subjected to data processing and output, such as a frame, in each VOB. The PTS of the first data sequence $D_1$ is detected by the data processing/output time comparator $603_1$ and the PTSs of the second to N-th data sequences $D_2$ to $D_N$ are detected by the data processing/output time detectors $603_2$ to $603_N$, respectively. Since the SCR and the PTS are assigned to each VOB with "0" as a reference, these values in different VOBs have no interrelations. So, different VOBs may have the same PTS when the time elapsed from the head of a VOB is equal to that of another VOB.

Therefore, the SCR value must be set in the system clock simultaneously with the end of image output for the VOB 1. In this fourth embodiment, PTS is detected by the data processing/output time comparator $603_1$, not from sub-picture data having discontinuous PTS values, but from main-picture data which is input continuously and has unintermittent PTS values, and the comparator $603_1$ outputs the data block boundary designating signal, so that the synchronizer 612 can set the SCR value in the system clock simultaneously with the end of image output for the VOB 1.

Accordingly, although the SCR and the PTS are assigned to each VOB with "0" as a reference and these values in different VOBs have no interrelations, since the VOB boundaries are detected, it is possible to update a reference of synchronization for each VOB.

Even though it is found that the image output for the VOB 1 is completed, there is a case where the SCR value of the VOB 2 cannot be set in the system clock.

In this fourth embodiment, however, since the synchronizer 612 can detect the end of image output for the VOB 1 from the data block boundary designating signal, it is possible to instruct the first data processing/output means $604_1$ to cancel the synchronization with the system clock. Accordingly, when data having continuous PTS values is processed and output while synchronizing the data sequences, to detect the VOB boundaries enables continuous data processing and output along the temporal order without skipping or delaying the processing.

Furthermore, even when the PTS values exist intermittently, since the synchronizer 612 can detect the end of image output for the VOB 1 from the data block boundary designating signal, it is possible to instruct the N-th data processing/output means $604_N$ to stop the data processing and output. The data processing and output are resumed after setting of the SCR value in the system clock.

Accordingly, when data having discontinuous PTS values is processed and output while synchronizing the data sequences, to detect the VOB boundaries enables data processing and output in correct timings, for each data block to which the PTS is added, according to the PTS.

As described above, according to the fourth embodiment of the invention, a device for synchronizing data processing comprises a reference time detecting means for detecting, from input data, reference time information required for updating a reference of synchronization; a demultiplexing means for demultiplexing the input data into N pieces of data sequences; N pieces of data processing/output means, each processing data included in one of the data sequences and outputting the processed data, according to synchronous information; M pieces of data processing/output time comparing means, each means detecting, from one of the data sequences, data processing/output time information that shows a time to process and output data included in the data sequence, detecting a boundary of data blocks in the input data by comparing the detected data processing/output time information with data processing/output time information which has previously been detected, and outputting a data block boundary designating signal; (N−M) pieces of data processing/output time detecting means, each means detecting, from one of the data sequences, data processing/output time information that shows a time to process and output data included in the data sequence; and a data processing/output synchronizing means for updating a reference of synchronization using the detected reference time information according to the data block boundary designating signal so that the N pieces of data processing/output means are synchronized with each other between the N pieces of data sequences and process and output the N pieces of data sequences in the temporal order without skipping or delaying processing, and for outputting the synchronous information to the N pieces of data processing/output means, according to the data block boundary designating signal detected by the M pieces of data processing/output comparing means and the data processing/output time information detected by the (N−M) pieces of data processing/output time detecting means, so that the N pieces of data processing/output means process and output data in correct timings. Therefore, when a reference time value and a data processing/output time value are given for each data block with a prescribed value as a reference and these values in different data blocks have no interrelations, since boundaries of the data blocks can be detected by comparing the reference time values, the reference of synchronization can be updated at this timing for each data block. Further, when data having continuous data processing/output time values is processed and output while synchronizing data sequences, to detect the data block boundaries enables continuous data processing and output, in the temporal order, without skipping or delaying processing. Furthermore, when data having intermittent data processing/output time values is processed and output while synchronizing data sequences, to detect the data block boundaries enables data processing and output in correct timings, for each data block to which the data processing/output time is added, according to the data processing/output time.

Data input to the device for synchronizing data processing according to this fourth embodiment is not restricted to a bit stream including main-picture data, audio data, and sub-picture data. Any data may be input as long as synchronous data processing (output) is desired.

Further, the position (connection) of the reference time detector 601 is not restricted to that shown in FIG. 8. Any of the first to N-th data sequences output from the demultiplexer 602 may be input to the detector 601.

Furthermore, a data sequence whose PTS information continuously changes is not restricted to the first data sequence. Any of the first to N-th data sequences may have continuous PTS information.

Although the device includes the first to N-th data sequence processing units $605_1$ to $605_N$, it may include only one data sequence processing unit having a data processing/output time comparator.

Furthermore, the continuously changing PTS information, which is added to the first data sequence $D_1$ in this fourth embodiment, may be used as SCR information. In this case, the reference time detector 601 can be dispensed with.

Embodiment 5

A device for synchronizing data processing according to a fifth embodiment of the invention receives serial data in which plural sequences of data, each having a coherent content, are multiplexed, and processes and outputs these data synchronously with each other without interruptions while detecting boundaries of the data sequences using data block boundary designating information included in the input data.

Figure 9:
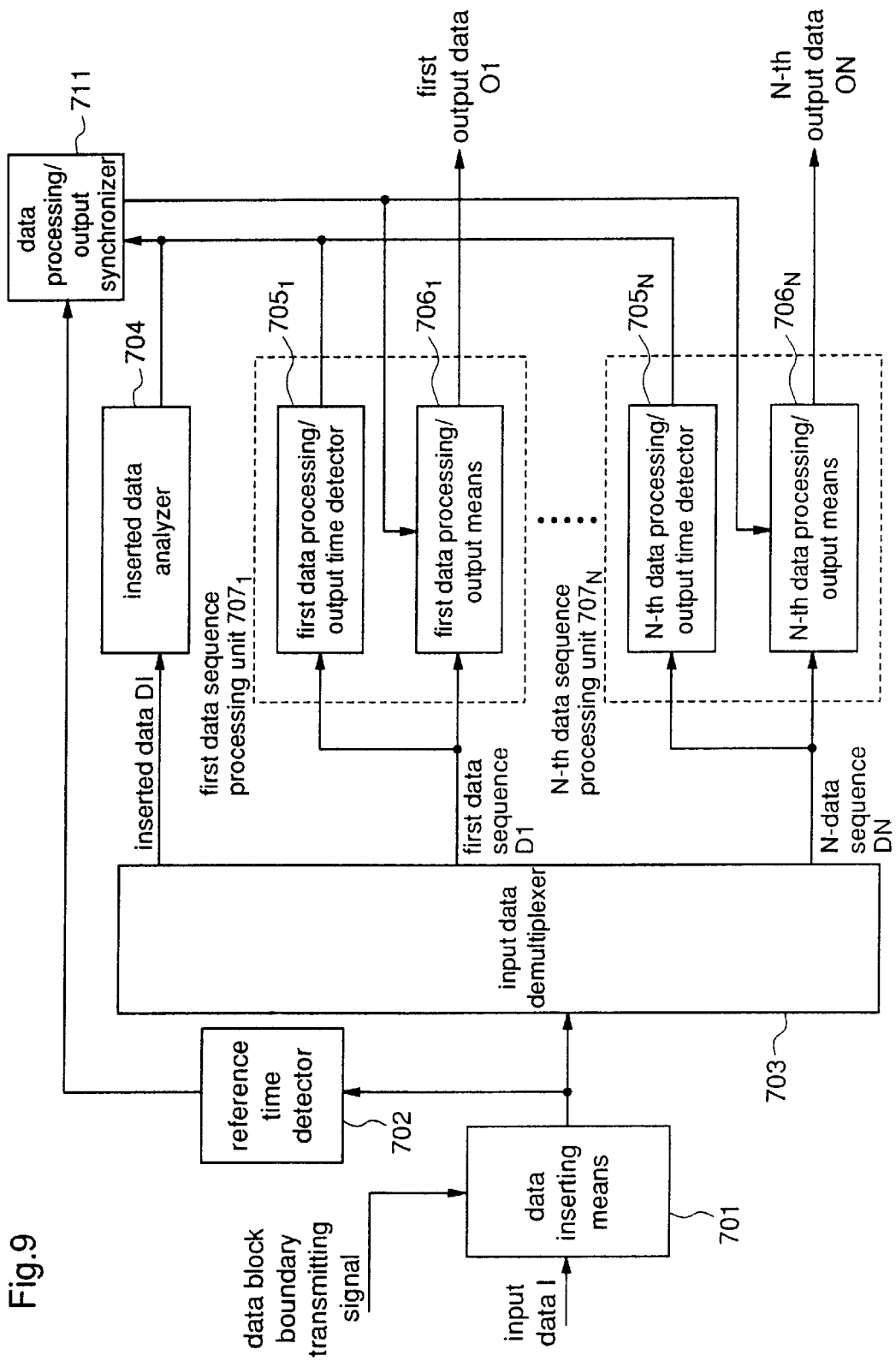
FIG. 9 is a block diagram illustrating a device for synchronizing data processing according to a fifth embodiment of the invention.

FIG. 9 is a block diagram illustrating a device for synchronizing data processing according to the fifth embodiment of the invention.

In FIG. 9, input data I is identical to that described for the second embodiment of the invention.

A data inserting means 701 inserts data showing data block boundaries in boundaries of data blocks of the input data I, according to a data block boundary transmitting signal supplied from an external device. A reference time detector 702 detects SCR information (reference time information) to be set in a system clock, from the input data I. An input data demultiplexer 703 demultiplexes the input data I to individual data sequences, generating first to N-th data sequences $D_1$ to $D_N$ and data DI which has been inserted in the input data I. A data analyzer 704 analyzes the inserted data DI and detects boundaries of data blocks of the input data I. A first data processing/output time detector $705_1$ detects PTS information (data processing/output time information) from the first data sequence $D_1$. A first data processing/output means $706_1$ processes data included in the first data sequence $D_1$ and outputs first output data $O_1$, according to a synchronous signal output from a data processing/output synchronizer 711. The first data processing/output time detector $705_1$ and the first data processing/output means $706_1$ constitute a first data sequence processing unit $707_1$. The device includes N pieces of data sequence processing units having the same structures as the first data sequence processing unit $707_1$. An N-th data sequence processing unit $707_N$ comprises an N-th data processing/output time detector $705_N$ and an N-th data processing/output means $706_N$.

The synchronizer 711 sets the SCR information detected by the reference time detector 702 in the system clock so that the first to N-th data processing/output means $706_1$ to $706_N$ are synchronized with each other, and process and output the respective data sequences in the temporal order, without skipping or delaying the processing. Further, the synchronizer 711 outputs a synchronous signal according to the PTS information detected by the first to N-th data sequence processing/output time detectors $705_1$ to $705_N$, so that the first to N-th data processing/output means $706_1$ to $706_N$ can process and output the data in correct timings.

A description is now given of the operation of the fifth embodiment of the invention. The input data I is a bit stream including main-picture data and sub-picture data. The data DI inserted in the input data I is dummy sub-picture data to which a PTS value of "0" is added. This dummy sub-picture data DI has no data to be processed and output by the data processing/output means, and only its PTS value has a meaning.

The data inserting means 701 inserts the dummy sub-picture data DI in boundaries of data blocks of the input data I according to a data block boundary transmitting signal supplied from an external device and showing data block boundaries in the input data I. The reference time detector 702 detects SCR information from the input data I and outputs the SCR information to the synchronizer 711. The input data demultiplexer 703 demultiplexes the input data I into individual data sequences, whereby N pieces of data sequences $D_1$ to $D_N$ are generated and the dummy sub-picture data DI is separated from the input data I.

The first data sequence processing unit $707_1$ processes and outputs the main-picture data while the N-th data sequence processing unit $707_N$ processes and outputs the sub-picture data.

The data analyzer 704 analyzes the sub-picture data DI and knows that the analyzed sub-picture data is dummy sub-picture data DI because its PTS value is "0". Then, the data analyzer 704 recognizes a point at which the dummy sub-picture data is inserted, as a boundary of data blocks, and outputs a data block boundary designating signal to the synchronizer 711.

The synchronizer 711 sets the SCR value of the next VOB in the system clock when all the data processing/output means $706_1$ to $706_N$ have completed the final data processing/output and all the data processing/output time detectors $705_1$ to $705_N$ have detected the first PTS value of the next VOB.

Receiving the data block boundary designating signal, the synchronizer 711 recognizes that the sub-picture data input after the dummy sub-picture data are data of the next VOB, and instructs the N-th data processing/output means $706_N$ to stop processing and output of the sub-picture data. Data processing and output are resumed when the SCR value is set in the system clock, or when a decrease in the PTS value added to the main-picture data is detected and the first data sequence processing unit $707_1$ starts data processing and output for the next VOB.

Accordingly, when data having intermittent PTS values is processed and output while synchronizing data sequences, since the data block boundaries are detected using dummy data inserted in the boundaries, data processing and output are realized in correct timings, for each data block to which the PTS is added, according to the PTS.

As described above, according to the fifth embodiment of the invention, a device for synchronizing data processing comprises a data inserting means for, according to a data block boundary designating signal that shows boundaries of data blocks in input data, inserting data showing the data block boundaries into the input data; a reference time detecting means for detecting, from the input data, reference time information required for updating a reference of synchronization; a demultiplexing means for demultiplexing the input data into N pieces of data sequences and the inserted data; M pieces of data analysis means for analyzing the inserted data to detect the boundaries of data blocks in the input data, and outputting a data block boundary designating signal; N pieces of data processing/output means, each processing data included in one of the input data sequences and outputting the processed data, according to synchronous information; N pieces of data processing/output time detecting means, each means detecting, from one of the data sequences, data processing/output time information that shows a time to process and output data included in the data sequence; and a data processing/output synchronizing means for updating a reference of synchronization using the detected reference time information according to the data block boundary designating signal so that the N pieces of data processing/output means are synchronized with each other between the N pieces of data sequences and process and output the N pieces of data sequences in the temporal order without skipping or delaying processing, and for outputting the synchronous information to the N pieces of data processing/output means, according to the data processing/output time information detected by the N pieces of data processing/output time detecting means, so that the N pieces of data processing/output means process and output data in correct timings. Therefore, when data having intermittent data processing/output time values is processed and output while synchronizing data sequences, since the data block boundaries are detected using dummy data inserted in the boundaries, data processing and output are realized in correct timings, for each data block to which the data processing/output time is added, according to the data processing/output time.

Further, boundaries of data blocks are detected from plural pieces of data blocks which are multiplexed and input to the device. Referring to the boundaries, SCR information extracted from the multiplexed data is set in the system clock, the multiplexed data is demultiplexed into plural pieces of data, and these data are processed and output synchronously with each other, whereby the reference of synchronization can be updated for each data block.

Data input to the device for synchronizing data processing according to this fifth embodiment is not restricted to a bit stream including main-picture data, audio data, and sub-picture data. Any data may be input as long as synchronous data processing (output) is desired.

Further, the position (connection) of the reference time detector 702 is not restricted to that shown in FIG. 9. Any of the first to N-th data sequences output from the demultiplexer 703 may be input to the detector 702.

Further, the position (connection) of the data inserting means 701 is not restricted to that shown in FIG. 9. Any of the first to N-th data sequences obtained in the input data demultiplexer 703 may be input to the data inserting means 701.

Furthermore, data to be inserted in the input data I by the data inserting means 701 is not restricted to dummy sub-picture data whose PTS value is "0". Any data may be inserted as long as it can be analyzed and recognized as inserted data by the analyzer 704.

Furthermore, when any of the data sequences has PTS information that changes continuously, this PTS information may be used as SCR information. In this case, the reference time detector 702 can be dispensed with.

Embodiment 6

A device for synchronizing data processing according to a sixth embodiment of the invention receives serial data in which plural sequences of data, each having a coherent content, are multiplexed, and processes and outputs these data synchronously with each other without interruptions. Further, this device can output data which have been input intermittently, within periods for VOBs corresponding to the intermittent data.

Figure 10:
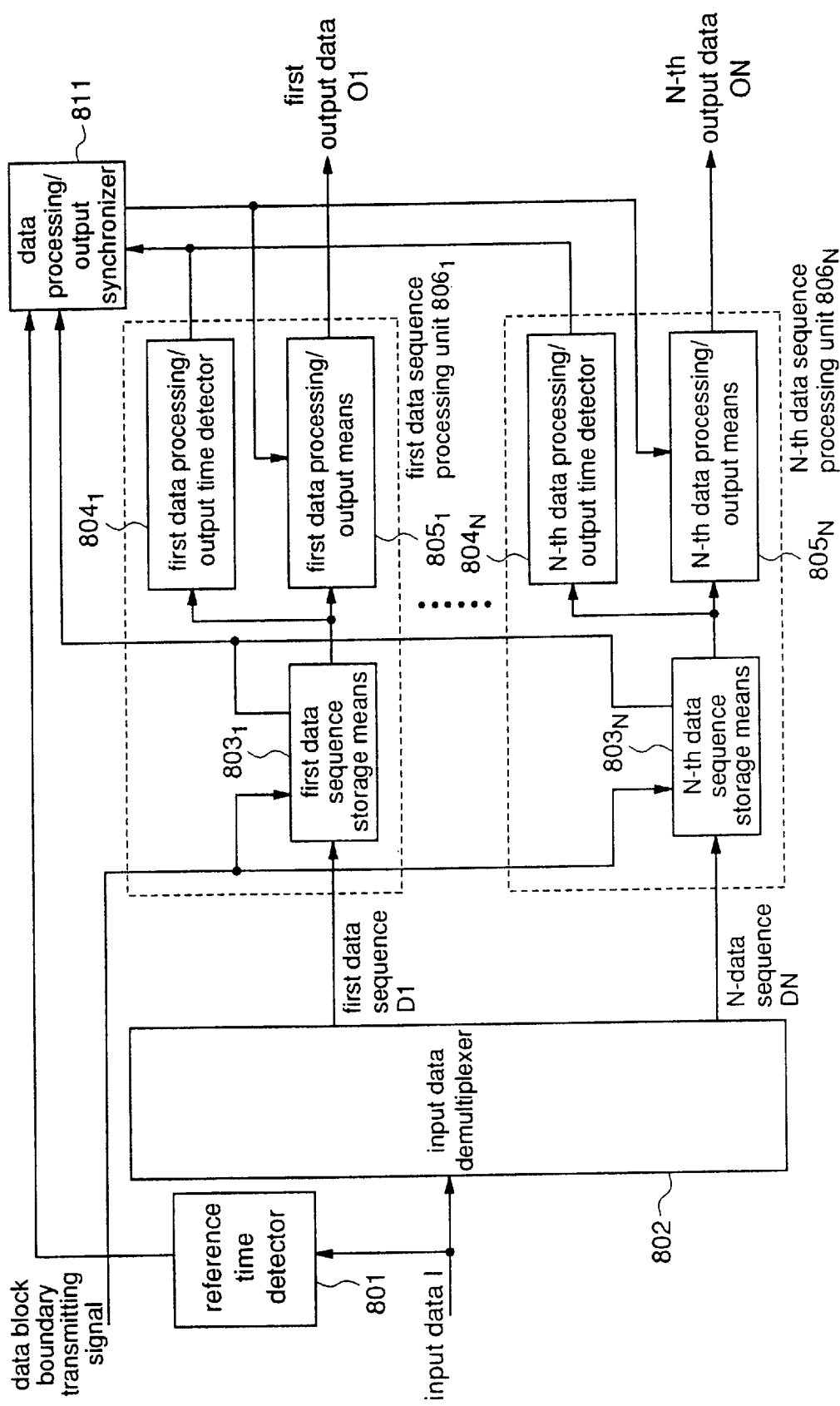
FIG. 10 is a block diagram illustrating a device for synchronizing data processing according to a sixth embodiment of the invention.
Figure 11:
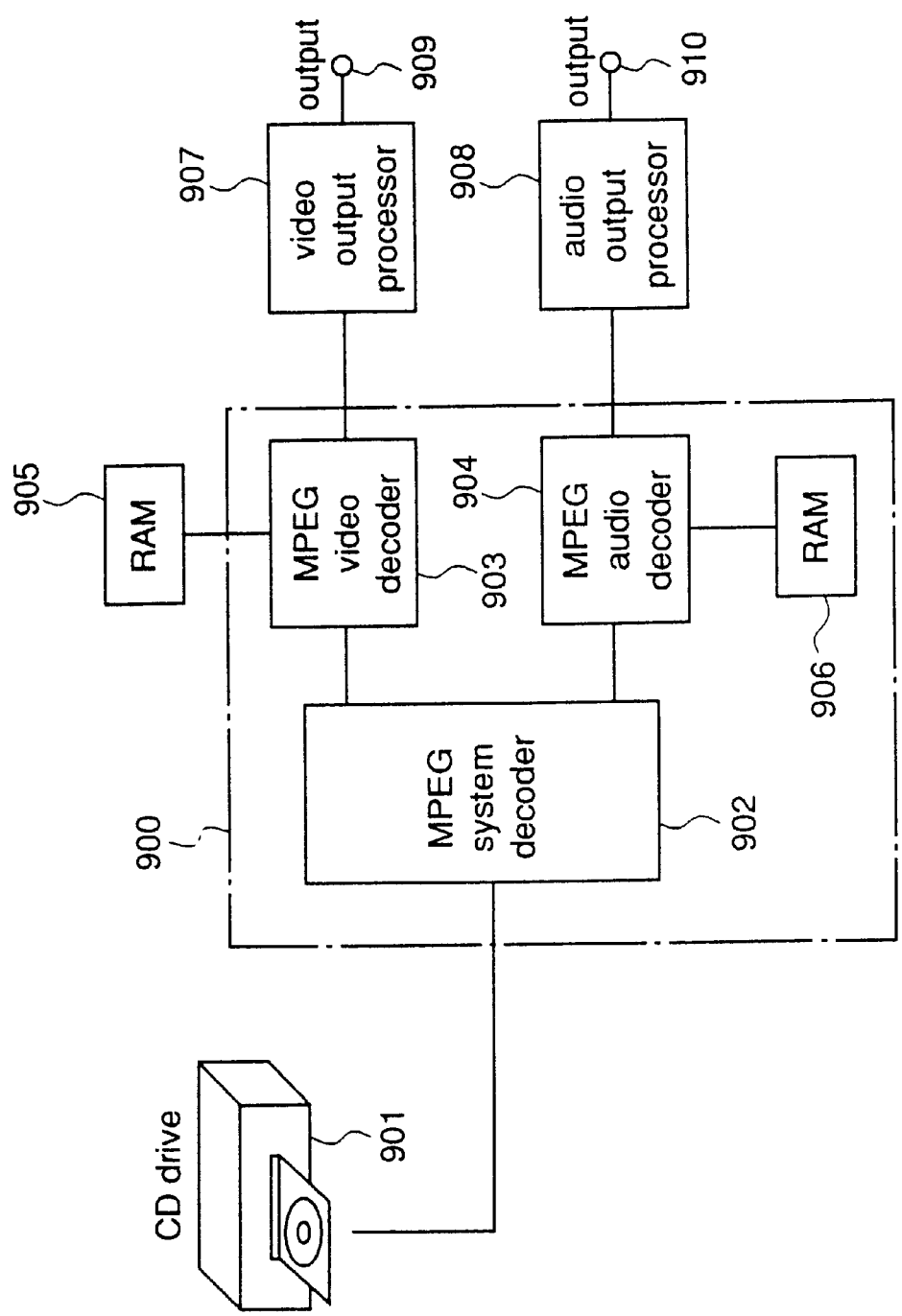
FIG. 11 is a block diagram illustrating a CD moving picture player.
Figure 12:
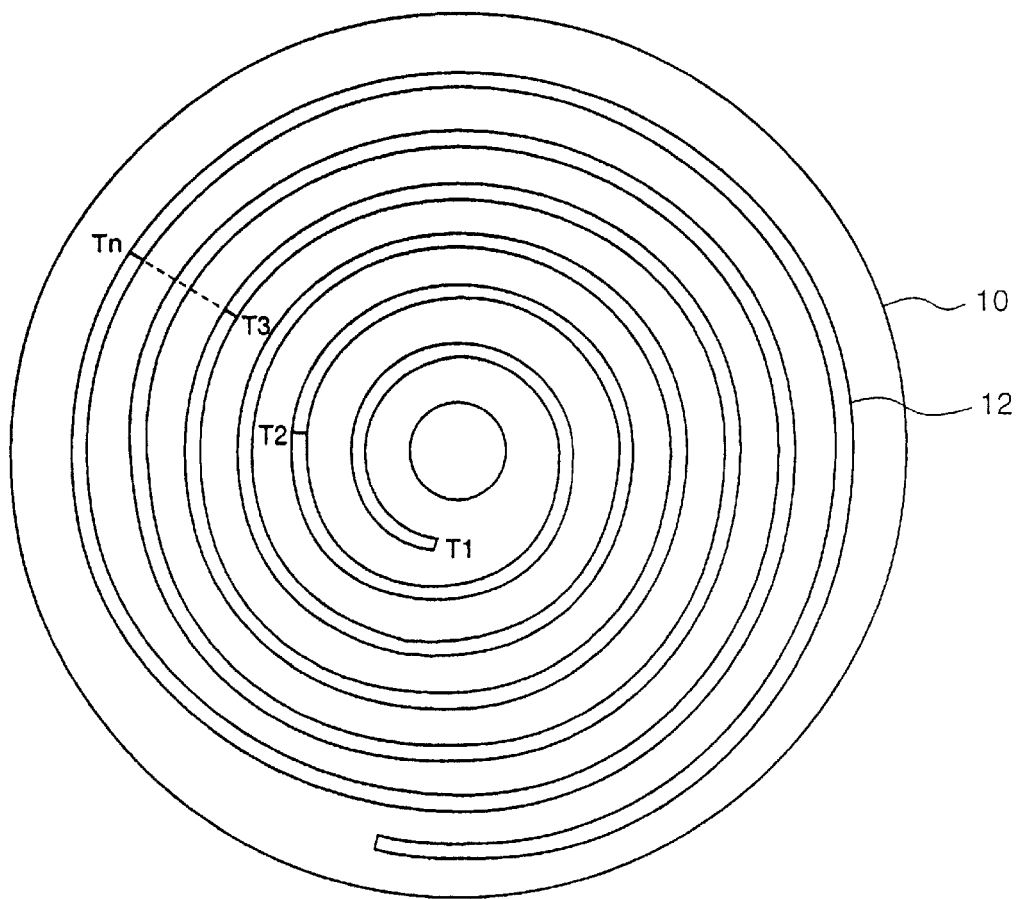
FIG. 12 is a schematic diagram illustrating tracks on an optical disk such as a CD.
Figure 13:
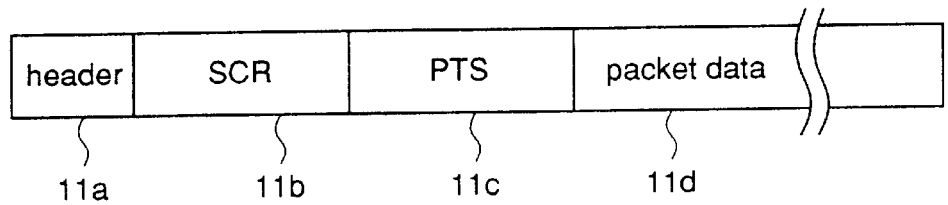
FIG. 13 is a diagram illustrating a format of data recorded on the tracks shown in FIG. 12.

FIG. 10 is a block diagram illustrating a device for synchronizing data processing according to the sixth embodiment of the invention.

In FIG. 10, input data I is identical to that described for the second embodiment of the invention.

A reference time detector 801 detects SCR information (reference time information) to be set in a system clock, from the input data I. An input data demultiplexer 802 demultiplexes the input data I to individual data sequences, generating first to N-th data sequences $D_1$ to $D_N$. A first data sequence storage means 803 stores the first data sequence $D_1$ and recognizes boundaries of data blocks in the data sequence $D_1$ according to a data block boundary transmitting signal supplied from an external device. A first data processing/output time detector $804_1$ detects PTS information (data processing/output time information) from the first data sequence $D_1$. A first data processing/output means $805_1$ processes data included in the first data sequence $D_1$ and outputs first output data $O_1$, according to a synchronous signal output from a data processing/output synchronizer 811. The first data storage means $803_1$, the first data processing/output time detector $804_1$, and the first data processing/output means $805_1$ constitute a first data sequence processing unit $806_1$. The device includes N pieces of data sequence processing units having the same structures as the first data sequence processing unit $806_1$. An N-th data sequence processing unit $806_N$ comprises an N-th data storage means $803_N$, an N-th data processing/output time detector $804_N$, and an N-th data processing/output means $805_N$.

The synchronizer 811 sets the SCR information detected by the reference time detector 801 in the system clock so that the first to N-th data processing/output means $805_1$ to $805_N$ are synchronized with each other, and process and output the respective data sequences in the temporal order, without skipping or delaying the processing. Further, the synchronizer 811 outputs a synchronous signal according to the PTS information detected by the first to N-th data sequence processing/output time detectors $804_1$ to $804_N$, so that the first to N-th data processing/output means $805_1$ to $805_N$ can process and output the data in correct timings.

A description is now given of the operation of the sixth embodiment of the invention. The input data I is a bit stream including main-picture data and sub-picture data.

The reference time detector 801 detects SCR information from the input data I and outputs the SCR information to the synchronizer 811. The input data I is demultiplexed into individual data sequences by the demultiplexer 802, generating N pieces of data sequences $D_1$ to $D_N$.

The first data sequence processing unit $806_1$ processes and outputs the main-picture data while the N-th data sequence processing unit $806_N$ processed and outputs the sub-picture data.

The first data sequence storage means $803_1$ counts the data block boundary transmitting signal which is input at every boundary of data blocks to recognize the number of each data block boundary. When the storage means $803_1$ outputs data up to the recognized data block boundary toward the first data processing/output means $805_1$, it outputs a data block boundary designating signal to the synchronizer 811.

Likewise, the N-th data sequence storage means 807 outputs a data block boundary designating signal to the synchronizer 811.

The synchronizer 811 sets the SCR value of the next VOB in the system clock when all the data processing/output means $805_1$ to $805_N$ have completed the final data processing/output for the present VOB and all the data processing/output time detectors $804_1$ to $804_N$ have detected the first PTS information of the next VOB.

When the synchronizer 811 receives the data block boundary designating signal, the synchronizer 811 recognizes that the sub-picture data stored in the N-th data sequence storage means $803_N$ after the signal input are data corresponding to the next VOB, and instructs the N-th data processing/output means $805_N$ to stop processing and output of the sub-picture data. Data processing and output are resumed when the SCR value is set in the system clock, or when a decrease in the PTS value added to the main-picture data is detected and the first data sequence processing unit $806_1$ starts data processing and output for the next VOB.

Accordingly, when data having intermittent PTS values is processed and output while synchronizing data sequences, since the VOB boundaries are recognized by the N-th data sequence storage means $803_N$, data processing and output are realized in correct timings, for each data block to which the PTS is added, according to the PTS.

As described above, according to the sixth embodiment of the invention, a device for synchronizing data processing comprises a reference time detecting means for detecting, from input data, reference time information required for updating a reference of synchronization; a demultiplexing means for demultiplexing the input data into N pieces of data sequences; M pieces of data storage means, each storing one of the N pieces of data sequences, recognizing a boundary of data blocks according to a data block boundary transmitting signal showing positions of boundaries of data blocks in the stored data sequence, and outputting a block boundary designating signal when output of data up to the recognized data block boundary has completed; N pieces of data processing/output means, each processing data included in one of the input data sequences and outputting the processed data, according to synchronous information; N pieces of data processing/output time detecting means, each means detecting, from one of the data sequences, data processing/output time information that shows a time to process and output data included in the data sequence; and a data processing/output synchronizing means for updating a reference of synchronization using the detected reference time information according to the data block boundary designating signal so that the N pieces of data processing/output means are synchronized with each other between the N pieces of data sequences and process and output the N pieces of data sequences in the temporal order without skipping or delaying processing, and for outputting the synchronous information to the N pieces of data processing/output means, according to the data processing/output time information detected by the N pieces of data processing/output time detecting means, so that the N pieces of data processing/output means process and output data in correct timings. Alternatively, the data stored in the data storage means are not the data sequences output from the demultiplexing means, but the input data. Therefore, when data having intermittent data processing/output time values is processed and output while synchronizing data sequences, since the data block boundaries are recognized by the data storage means, data processing and output are realized in correct timings, for each data block to which the data processing/output time is added, according to the data processing/output time.

Further, boundaries of data blocks are detected from plural pieces of data blocks which are multiplexed and input to the device. Referring to the boundaries, SCR information extracted from the multiplexed data is set in the system clock, the multiplexed data is demultiplexed into plural pieces of data, and these data are processed and output synchronously with each other, whereby the reference of synchronization can be updated for each data block.

Data input to the device for synchronizing data processing according to this sixth embodiment is not restricted to a bit stream including main-picture data, audio data, and sub-picture data. Any data may be input as long as synchronous data processing (output) is desired.

Further, the position (connection) of the reference time detector 801 is not restricted to that shown in FIG. 10. Any of the first to N-th data sequences obtained in the input data demultiplexer 802 may be input to the detector 801.

Further, the positions (connections) of the data sequence storage means $803_1$ to $803_N$ are not restricted to those shown in FIG. 10. The input data I before it is demultiplexed by the demultiplexer 802 may be input to the storage means.

Furthermore, when any of the data sequences has PTS information that changes continuously, this PTS information may be used as SCR information. In this case, the reference time detector 801 can be dispensed with.

In the second to sixth embodiments of the invention, employed as a method of adjusting a reference of synchronization for each data block is to set a value of reference time information (SCR value) in the system clock. However, the invention is not restricted to this method. For example, in an alternative method, a difference between a continuously increasing system clock and a reference time may be detected at every change of data block.

What is claimed is:

1. A device for synchronizing data processing, receiving N (N=integer, 1≦N) pieces of data sequences, each sequence comprising plural data blocks, said device comprising:

N data processing/output means, each means for processing data included in an input data sequence and outputting processed data, according to synchronous information; and means of synchronizing data processing/output, which updates a reference of synchronization, according to a data block boundary designating information that shows boundaries of data blocks constituting N pieces of data sequences, and outputs the synchronous information to the N data processing/output means, according to data processing/output timings of the N pieces of data sequences, so that the N data processing/output means are synchronized with each other and process and output data in the respective data sequences in correct timings along the temporal order.

2. The device of claim 1 further comprising data block boundary detecting means for detecting boundaries of the data blocks included in the N pieces of data sequences input to the device, and outputting the data block boundary designating information.

3. The device of claim 1 further comprising data processing/output information detecting means for detecting data processing/output information from the N pieces of data sequences input to the device, and outputting the data processing/output timing information.

4. A device for synchronizing data processing, and receiving input data comprising a plurality of data blocks, each block comprising plural data sequences, said device comprising:

data block boundary detecting means for detecting boundaries of the data blocks in the input data, and outputting data block boundary designating information showing the boundaries of the data blocks;

reference time detecting means for detecting, from the input data, reference time information required for updating a reference of synchronization' demultiplexing means for demultiplexing the input data into N (N=integer, 1≦N) pieces of data sequences;

N data processing/output means, each means for processing data included in one of the input data sequences and outputting processed data, according to synchronous information;

N means for detecting data processing/output time, each means for detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N data processing/output means, according to the data processing/output time information detected by the N means for detecting data processing/output time, wherein the N data processing/output means are synchronized with each other and process and output the data in the respective data sequences in correct timings along the temporal order.

5. The device of claim 4 wherein the data processing/output time information detected by the data processing/output time detecting means is used as the reference time information.

6. The device of claim 4 wherein the input data includes video data.

7. The device of claim 4 wherein the input data includes audio data.

8. A device for synchronizing data processing, receiving input data comprising a plurality of data blocks, each block comprising plural data sequences, said device comprising:

reference time detecting means for detecting reference time information required for updating a reference of synchronization from the input data, and detecting a boundary of data blocks in the input data by comparing the detected reference time information with reference time information which has previously been detected, and outputting data block boundary designating information, and demultiplexing means for demultiplexing the input data into N (N=integer, N≦1) pieces of data sequences;

N data processing/output means, each means for processing data included in one of the input data sequences and outputting processed data, according to synchronous information;

N means for detecting data processing/output time, each means for detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N data processing/output means, according to the data processing/output time information detected by the N means for detecting data processing/output time, so that the N data processing/output means are synchronized with each other and process and output the data in the respective data sequences in correct timings along the temporal order.

9. The device of claim 8 wherein the input data includes video data.

10. The device of claim 8 wherein the input data includes audio data.

11. A device for synchronizing data processing, receiving input data comprising a plurality of data blocks, each block comprising plural data sequences, said device comprising:
reference time detecting means for detecting, from the input data, reference time information required for updating a reference of synchronization;
demultiplexing means for demultiplexing the input data into N (N=integer, $1 \leq N$) pieces of data sequences;
N pieces of data processing/output means, each processing data included in one of the input data sequences and outputting the processed data, according to synchronous information;
M (M=integer, $1 \leq M \leq N$) pieces of means for comparing data processing/output time, each means detecting, from one of the data sequences, data processing/output time information that shows a time to process and output data included in the data sequence, and detecting a boundary of data blocks in the input data by comparing the detected data processing/output time information with data processing/output time information which has previously been detected, and outputting data block boundary designating information;
(N−M) pieces of means for detecting data processing/output time, each means detecting, from one of the data sequences, data processing/output time information that shows a time to process and output data included in the data sequence; and
means for synchronizing data processing/output, which updates a reference of synchronization using the detected reference time information according to the data block boundary designating information, and outputs the synchronous information to the N pieces of data processing/output means, according to the data processing/output time information detected by the M pieces of means for comparing data processing/output time and by the (N−M) pieces of means for detecting data processing/output time, so that the N pieces of data processing/output means are synchronized with each other and process and output the data in the respective data sequences in correct timings along the temporal order.

12. The device of claim 11 wherein the data processing/output time information detected by the means for comparing data processing/output time or the data processing/output time information detected by the means for detecting data processing/output time is used as the reference time information.

13. The device of claim 11 wherein the data processing/output time information detected by the data processing/output time detecting means is used as the reference time information.

14. The device of claim 11 wherein the input data includes video data.

15. The device of claim 11 wherein the input data includes audio data.

16. A device for synchronizing data processing, receiving input data comprising a plurality of data blocks, each block comprising plural data sequences, said device comprising:
data inserting means for inserting data showing the data block boundaries into the input data according to data block boundary designating information that shows boundaries of data blocks located in the input data;
reference time detecting means for detecting reference time information required for updating a reference of synchronization from the input data;
demultiplexing means for demultiplexing the input data into N (N=integer, $1 \leq N$) pieces of data sequences and the inserted data;
M (M=integer, $1 \leq M \leq N$) data analysis means for analyzing the inserted data to detect the boundaries of data blocks in the input data, and outputting the data block boundary designating information;
N data processing/output means, each processing data included in one of the input data sequences and outputting the processed data, according to synchronous information;
N means for detecting data processing/output time, each means detecting, from one of the data sequences, data processing/output time information that shows a time to process and output data included in the data sequence; and
means for synchronizing data processing/output, which updates a reference of synchronization using the detected reference time information according to the data block boundary designating information, and outputs the synchronous information to the N data processing/output means, according to the data processing/output time information detected by the N means for detecting data processing/output means are synchronized with each other and process and output the data in the respective data sequences in correct timings along the temporal order.

17. The device of claim 16 wherein the data inserting means inserts data whose data processing/output time is specified, into at least one of the N pieces of data sequences.

18. The device of claim 16 wherein the data inserting means inserts data whose data processing/output time is 0, into at least one of the N pieces of data sequences.

19. The device of claim 16 wherein the data processing/output time information detected by the data processing/output time detecting means is used as the reference time information.

20. The device of claim 16 wherein the input data includes video data.

21. The device of claim 16 wherein the input data includes audio data.

22. A device for synchronizing data processing, receiving input data comprising a plurality of data blocks, each block comprising plural data sequences, said device comprising;
reference time detecting means for detecting reference time information required for updating a reference of synchronization from the input data;
demultiplexing means for demultiplexing the input data into N (N=integer, $1 \leq N$) pieces of data sequences;
M (M=integer, $1 \leq M \leq N$) data storage means, each storing one of the N pieces of data sequences, each recognizes a boundary of data blocks according to data block boundary transmitting information showing positions of boundaries of data blocks in the stored data sequence, and each outputs data block boundary designating information when output of data up to the recognized data block boundary is complete;
N data processing/output means, each processing data included in one of the input data sequences and outputting processed data, according to synchronous information;

N means for detecting data processing/output time, each means detecting, from one of the data sequences, data processing/output time information that shows a time to process and output data included in the data sequence; and means for synchronizing data processing/output, which updates a reference of synchronization using the detected reference time information according to the data block boundary designating information, and outputs the synchronous information to the N data processing/output means, according to the data processing/output time information detected by the N means for detecting data processing/output time, so that the N data processing/output means are synchronized with each other and process and output the data in the respective data sequences in correct timings along the temporal order.

23. The device of claim 22 wherein the data stored in the data storage means is not the data sequence output from the demultiplexing means but the input data.

24. The device of claim 22 wherein the data processing/output time information detected by the data processing/output time detecting means is used as the reference time information.

25. The device of claim 22 wherein the input data includes video data.

26. The device of claim 22 wherein the input data includes audio data.

27. A device for synchronizing data processing, which receives an input data sequence and decodes the data sequence in the order designated by a host device, said input data sequence comprising plural sequences of data blocks and having data processing/output timing information that is given so that its value continuously increases while a data block is being processed and returns to an initial value when proceeding to the next data block, said device comprising:

reference time setting means for setting reference time information, which is synchronized with the data processing/output timing information and varies from the data processing/output timing information by a prescribed value, in a reference clock to provide a reference time;

data processing/output means for outputting decoded data when a difference between the data processing/output timing information and the reference time becomes a prescribed value; and data block boundary detecting means for detecting a boundary of data blocks when the data processing/output timing information returns to the initial value after the data processing changes to the next data block in the input data sequence;

wherein, after the data block boundary detecting means detects that the data processing changes to the next data block in the input data sequence, the value of the reference time is continuously increased for a prescribed period of time and then the reference time information is set in the reference clock by the reference time setting means, whereby continuity of output data at the boundary of the data blocks is secured.

28. The device of claim 27 wherein the input data sequences are processed in parallel and synchronously with each other.

29. The device of claim 27 wherein the input data sequences are N pieces of data sequences, each having data processing/output timing information of the same initial value and increasing independently.

30. A device for synchronizing data processing, which receives an input data sequence and decodes the data sequences in the order designated by a host device, said input data sequence comprising plural sequences of data blocks and having reference time information that is given so that its value increases continuously while a data block is being processed and returns to an initial value when proceeding to the next data block, and data processing/output timing information that is given so that its value increases while a data block is being processed and returns to an initial value when proceeding to the next data block, said device comprising:

reference time information setting means for setting the reference time information in a reference clock to provide a reference time;

data processing/output means for outputting decoded data when a difference between the data processing/output timing information and the reference time becomes a prescribed value; and data block boundary detecting means for detecting a boundary of data blocks by that the reference time information returns to the initial value when the data processing changes to the next data block in the input data sequence;

wherein, after the data block boundary detecting means detects that the data processing changes to the next data block in the input data sequence, the value of the reference time is continuously increased for a prescribed period of time and then the reference time information is set in the reference clock by the reference time setting means, whereby continuity of output data at the boundary of the data blocks is secured.

31. The device of claim 27 wherein the prescribed value is determined on the basis of the processing time of the device.

32. The device of claim 30 wherein the prescribed value is determined on the basis of the processing time of the device.

33. The device of claim 30 wherein the input data sequences are plural data sequences processed in parallel and synchronously with each other.

34. The device of claim 30 wherein the input data sequences are N pieces of data sequences, each having data processing/output timing information of the same initial value and increasing independently.

* * * * *